US009036902B2

(12) United States Patent
Nathan et al.

(10) Patent No.: US 9,036,902 B2
(45) Date of Patent: May 19, 2015

(54) DETECTOR FOR CHEMICAL, BIOLOGICAL AND/OR RADIOLOGICAL ATTACKS

(75) Inventors: Anoo Nathan, San Jose, CA (US); Chandan Gope, Cupertino, CA (US); Albert Kay, San Francisco, CA (US)

(73) Assignee: INTELLIVISION TECHNOLOGIES CORPORATION, San Jose, CA (US)

( * ) Notice: Subject to any disclaimer, the term of this patent is extended or adjusted under 35 U.S.C. 154(b) by 0 days.

(21) Appl. No.: 12/932,610

(22) Filed: Mar. 1, 2011

(65) Prior Publication Data
US 2012/0106782 A1 May 3, 2012

Related U.S. Application Data

(63) Continuation-in-part of application No. 12/753,892, filed on Apr. 4, 2010, now abandoned, which is a continuation-in-part of application No. 12/459,073, filed on Jun. 25, 2009, now Pat. No. 8,300,890, and a continuation-in-part of application No. 12/011,705, filed on Jan. 28, 2008, now abandoned, and a continuation-in-part of application No. 12/157,654, filed on Jun. 11, 2008, now abandoned, and a continuation-in-part of application No. 12/154,085, filed on May 19, 2008, now Pat. No. 8,075,499, which is a continuation-in-part of application No. 12/011,705, filed on Jan. 28, 2008, now abandoned, (Continued)

(51) Int. Cl.
| | |
|---|---|
| G06K 9/62 | (2006.01) |
| G08B 17/12 | (2006.01) |
| G06K 9/00 | (2006.01) |
| G08B 13/196 | (2006.01) |
| G08B 21/14 | (2006.01) |
| G06K 9/46 | (2006.01) |
| G06K 9/48 | (2006.01) |

(52) U.S. Cl.
CPC ............ *G08B 17/12* (2013.01); *G06K 9/00771* (2013.01); *G06K 9/469* (2013.01); *G06K 9/482* (2013.01); *G06K 9/6215* (2013.01); *G06K 2009/488* (2013.01); *G08B 13/19613* (2013.01); *G08B 21/14* (2013.01)

(58) Field of Classification Search
None
See application file for complete search history.

(56) References Cited

U.S. PATENT DOCUMENTS

| | | | | |
|---|---|---|---|---|
| 2003/0137426 | A1* | 7/2003 | Anthony et al. | 340/574 |
| 2005/0131705 | A1* | 6/2005 | Gandhi et al. | 704/273 |
| 2005/0259849 | A1* | 11/2005 | Pavlidis | 382/118 |
| 2006/0137018 | A1* | 6/2006 | Herschaft | 726/26 |
| 2006/0171453 | A1* | 8/2006 | Rohlfing et al. | 375/240.01 |
| 2010/0020166 | A1* | 1/2010 | Levine et al. | 348/82 |

OTHER PUBLICATIONS

Ahlberg et al., "Prometheus: Prediction and interpretation of human behavior based on probabilistic structures and heterogeneous sensors", In Proc. of the 18th European Conf. on Artificial Intelligence, ECAI (2008), Patras, Greece, Jul. 21-25, 2008.*
Andersson et al., "Estimation of crowd behavior using sensor networks and sensor fusion," Information Fusion, 2009. FUSION '09. 12th International Conference, pp. 396-403, Jul. 6-9, 2009.*
Dasey et al., "Information Fusion and Response Guidance", Lincoln Lab. J., vol. 17, No. 1, 2007.*

(Continued)

*Primary Examiner* — Bhavesh Mehta
*Assistant Examiner* — Andrew Moyer
(74) *Attorney, Agent, or Firm* — David Lewis

(57) ABSTRACT

This specification generally relates to methods and algorithms for detection of chemical, biological, and/or radiological attacks. The methods use one or more sensors that can have visual, audio, and/or thermal sensing abilities and can use algorithms to determine by behavior patterns of people whether there has been a chemical, biological and/or radiological attack.

27 Claims, 14 Drawing Sheets

Related U.S. Application Data said application No. 12/459,073 is a continuation-in-part of application No. 12/072,186, filed on Feb. 25, 2008, now abandoned.

(60) Provisional application No. 61/211,820, filed on Apr. 3, 2009, provisional application No. 61/133,218, filed on Jun. 25, 2008, provisional application No. 61/133,215, filed on Jun. 25, 2008, provisional application No. 61/133,259, filed on Jun. 26, 2008, provisional application No. 60/898,341, filed on Jan. 29, 2007, provisional application No. 60/898,472, filed on Jan. 30, 2007, provisional application No. 60/898,603, filed on Jan. 30, 2007, provisional application No. 60/934,207, filed on Jun. 11, 2007, provisional application No. 60/930,766, filed on May 18, 2007, provisional application No. 60/903,026, filed on Feb. 23, 2007.

(56) References Cited

OTHER PUBLICATIONS

Foroughi et al., "Intelligent video surveillance for monitoring fall detection of elderly in home environments," Computer and Information Technology, 2008. ICCIT 2008. 11th International Conference, pp. 219-224, Dec. 24-27, 2008.*

Jopling, "Chemical, biological, radiological OR nuclear (CBRN) detection: A technological overview," Special Report to NATO Parliamentary Assembly, 167 CDS 05 E rev 2, 2005.*

Kumar et al., "Study of Robust and Intelligent Surveillance in Visible and Multi-modal Framework," Indian Institute of Technology, Nov. 12, 2007.*

Liu et al., "Elderly-falling detection using distributed direction-sensitive pyroelectric infrared sensor arrays," Multidim Syst Sign Process DOI 10.1007/s11045-011-0161-4; Oct. 15, 2011.*

Committee on Assessment of Security Technologies for Transportation, National Research Council, "Defending the U.S. Air Transportation System Against Chemical and Biological Threats," ISBN: 0-309-65553-6, 46 pages, 2006.*

Tao et al., "Fall Incidents Detection for Intelligent Video Surveillance," ICICS 2005.*

Töreyin et al., "HMM Based Falling Person Detection Using Both Audio and Video," Computer Vision in Human-Computer Interaction, vol. 3766, pp. 211-220, ISBN: 978-3-540-29620-1, 2005.*

Wang, Liang, "From Blob Metrics to Posture Classification to Activity Profiling," Pattern Recognition, 2006. ICPR 2006. 18th International Conference, vol. 4, pp. 736-739, 2006.*

Wu, Chen et al., "Mapping Vision Algorithms on SIMD Architecture Smart Cameras," Distributed Smart Cameras, 2007. ICDSC '07. First ACM/IEEE International Conference, pp. 27-34, Sep. 25-28, 2007.*

Wu, Xinyu et al., "A detection system for human abnormal behavior," Intelligent Robots and Systems, 2005. (IROS 2005). 2005 IEEE/RSJ International Conference, pp. 1204-1208, Aug. 2-6, 2005.*

Wu, Xinyu et al., "Intelligent household surveillance robot," Robotics and Biomimetics, 2008. ROBIO 2008. IEEE International Conference, pp. 1734-1739, Feb. 22-25, 2009.*

Sixsmith et al., "Pyrolitic IR sensor arrays for fall detection in the older population", J. Phys. IV France, vol. 128, pp. 153-160, 2005.*

* cited by examiner

DETECTOR FOR CHEMICAL, BIOLOGICAL AND/OR RADIOLOGICAL ATTACKS

CROSS-REFERENCE TO RELATED APPLICATIONS

This application is a continuation-in-part of U.S. Provisional patent application Ser. No. 12/753,892, entitled "Detector for Chemical, Biological and/or Radiological Attacks," filed Apr. 4, 2010, by Anoo Nathan et al., which is incorporated herein by reference; this application also claims priority benefit of U.S. Provisional Patent Application No. 61/211,820, entitled "Algorithms and Optical Sensor Hardware Systems for Detection of Chemical, Biological, and/or Radiological Attacks," filed Apr. 3, 2009, by Anoo Nathan et al., which is incorporated herein by reference; this application is also a continuation-in-part of U.S. patent application Ser. No. 12/459,073, entitled "Person/Object Imaging and Screening," filed Jun. 25, 2009, by Deepak Gaikwad et al., U.S. patent application Ser. No. 12/459,073 also claims priority benefit of U.S. Provisional Patent Application No. 61/133,218, entitled, "Object Detection for Person Screening Systems," by Alexander Brusin, filed Jun. 25, 2008, which is incorporated herein by reference; U.S. patent application Ser. No. 12/459,073 also claims priority benefit of U.S. Provisional Patent Application No. 61/133,215, entitled, "High Resolution Image or Video Enhancement," by Alexander Bovyrin et al., filed Jun. 25, 2008, which is incorporated herein by reference; U.S. patent application Ser. No. 12/459,073 also claims priority benefit of U.S. Provisional Patent Application No. 61/133,259, entitled, "An Advanced Architecture and Software Solution for Person/Object Screening Imaging Systems," by Deepak Gaikwad et al., filed Jun. 26, 2008, which is incorporated herein by reference; this application is also a continuation in-part of U.S. patent application Ser. No. 12/011,705, entitled, "Image Manipulation for Videos and Still Images,", filed Jan. 28, 2008 by Chandan Gope et al. which is incorporated herein by reference; U.S. patent application Ser. No. 12/011,705 claims priority benefit of U.S. Provisional Patent Application No. 60/898,341, filed Jan. 29, 2007, which is incorporated herein by reference; U.S. patent application Ser. No. 12/011,705 also claims priority benefit of U.S. Provisional Patent Application No. 60/898,472, filed Jan. 30, 2007, which is also incorporated herein by reference; and U.S. patent application Ser. No. 12/011,705 claims priority benefit of U.S. Provisional Patent Application No. 60/898,603, filed Jan. 30, 2007, which is also incorporated herein by reference; U.S. patent application Ser. No. 12/011,705 is also a continuation in part of U.S. patent application Ser. No. 12/072,186, entitled "An Image and Video Stitching and Viewing Method and System," filed Feb. 25, 2008, by Alexander Kuranov et al. which is incorporated herein by reference, U.S. patent application Ser. No. 12/072,186 claims priority benefit of U.S. Provisional Patent Application No. 60/903,026, filed Feb. 23, 2007, which is incorporated herein by reference; this application is also a continuation-in-part of U.S. patent application Ser. No. 12/157,654, entitled "Image Search," filed Jun. 11, 2008, by Dennis V. Popov, which claims priority benefit of U.S. Provisional Patent Application No. 60/934,207, filed Jun. 11, 2007, which is incorporated herein by reference; this application is also a continuation-in-part of U.S. patent application Ser. No. 12/154,085, entitled "Abnormal Motion Detector and Monitor," filed May 19, 2008, by Vaidhi Nathan, which claims priority benefit of U.S. Provisional Patent Application No. 60/930,766, entitled "Intelligent Seizure Detector and Monitor," filed May 18, 2007, by Vaidhi Nathan et al., which is incorporated herein by reference; U.S. patent application Ser. No. 12/154,085 is also a continuation-in-part of U.S. patent application Ser. No. 12/011,705, entitled "Image Manipulation for Videos and Still Images," filed Jan. 28, 2008, by Chandan Gope et al., which is incorporated herein by reference; U.S. patent application Ser. No. 12/011,705 claims priority benefit of U.S. Provisional Patent Application No. 60/898,341, filed Jan. 29, 2007, which is incorporated herein by reference; U.S. patent application Ser. No. 12/011, 705 application also claims priority benefit of U.S. Provisional Patent Application No. 60/898,472, filed Jan. 30, 2007, which is also incorporated herein by reference; and U.S. patent application Ser. No. 12/011,705 also claims priority benefit of U.S. Provisional Patent Application No. 60/898, 603, filed Jan. 30, 2007, which is incorporated herein by reference. All of the above applications are incorporated herein by reference.

FIELD

This specification generally relates to methods and algorithms for detection of chemical, biological, and/or radiological attacks.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

The threat of chemical, biological, and/or radiological attacks has intensified over the last few years. Chemical, biological, and/or radiological attacks are difficult to pre-empt and may cause mass destruction. Early detection and warnings to alert the public or occupants of an area, can be critical in minimizing and controlling the amount of damage caused by chemical, biological, and/or radiological attacks. Chemical, biological, and/or radiological attacks may cause serious injuries, severe health problems and even death in many cases. At the very least, chemical, biological, and/or radiological attacks impair the individual's ability to function. There is a need to detect these attacks as early as possible to minimize the negative effects of the chemical, biological, and/or radiological attack. One common way to protect against attacks is to sample the air and do chemical, radiological, and/or biological analysis on the sample. However, the problems with this approach include the following, chemical and biological detection devices are expensive, it is hard to detect all chemicals and biologicals and, most importantly, it can take anywhere from several minutes to several hours to run tests on the air samples. Also chemical detection is short range because air is sampled only in the immediate vicinity of the sensor.

BRIEF DESCRIPTION OF THE FIGURES

In the following drawings like reference numbers are used to refer to like elements. Although the following figures depict various examples of the invention, the invention is not limited to the examples depicted in the figures.

DETAILED DESCRIPTION

Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

Embodiments of the hardware and methods will now be described with reference to the figures. In general, at the beginning of the discussion of each of FIGS. 1, 2, and 9A-12 is a brief description of each element, which may have no more than the name of each of the elements in the one of FIGS. 1, 2, and 9A-12 that is being discussed. After the brief description of each element, each element is further discussed in numerical order. In general, each of FIGS. 1-13 is discussed in numerical order and the elements within FIGS. 1-13 are also usually discussed in numerical order to facilitate easily locating the discussion of a particular element. Nonetheless, there is no one location where all of the information of any element of FIGS. 1-13 is necessarily located. Unique information about any particular element or any other aspect of any of FIGS. 1-13 may be found in, or implied by, any part of the specification.

Figure 1:
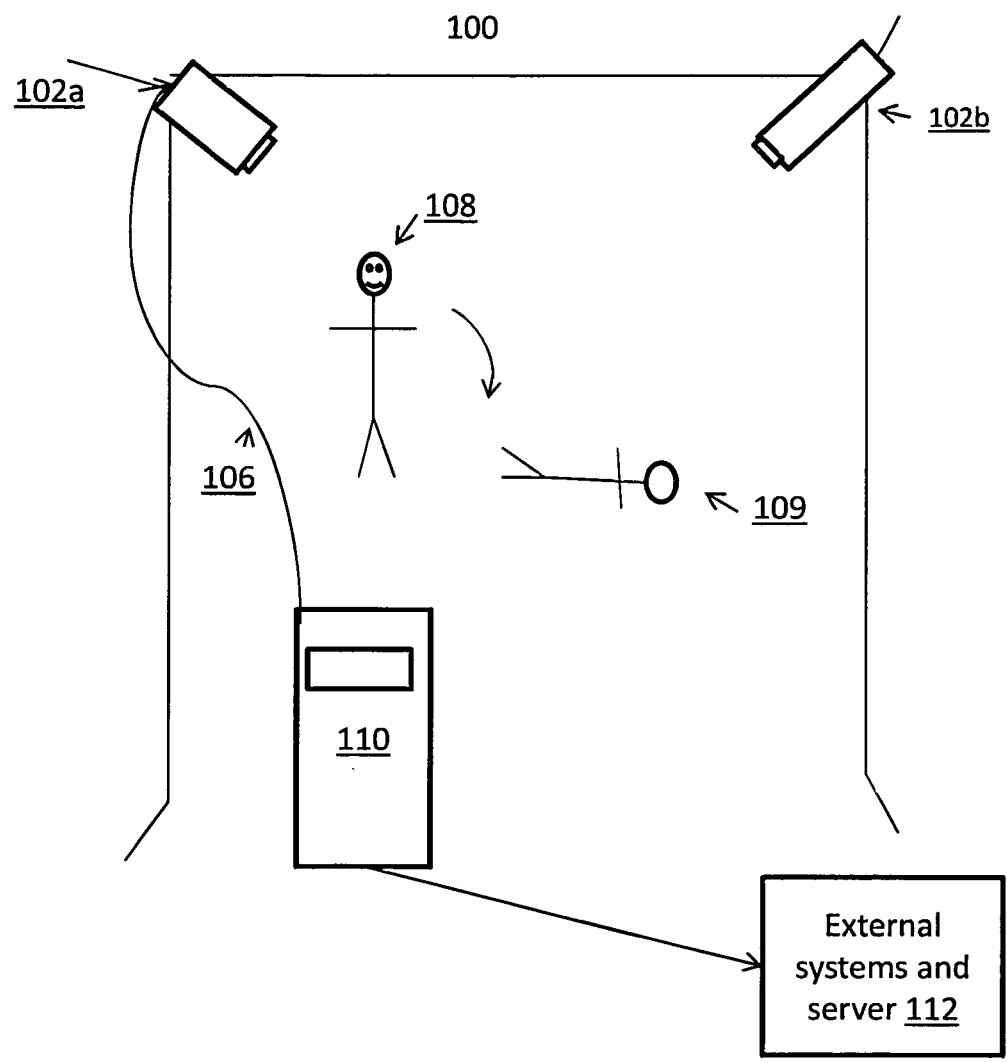
FIG. 1 shows a block diagram of an embodiment of the system for detection of chemical, biological and/or radiological attacks.

FIG. 1 shows a block diagram of an embodiment of a hardware system for detection of chemical, biological and/or radiological attacks 100. The hardware system 100 may include sensors 102*a-n*, one or more communications lines 106, one or more persons 108, one or more persons under duress 109, a computer 110, and external systems 112, the computer 110 in intercommunication with the external systems 112. The sensors 102*a-n* may be in communication with the processing device 110 via a communications line (106). Alternatively, the communication can be wireless. In other embodiments the hardware system 100 may not have all of the elements or features listed and/or may have other elements or features instead of or in addition to those listed.

Hardware system 100 is an example of a system including non-contact, passive, and remote sensing devices to detect chemical, biological, or radiological attacks at a location or in a building. People who have been exposed to chemical, biological, and/or radiological agents or elements, may display a number of different abnormal behavior and activity patterns. Although the specification refers to abnormal behavior of a person, abnormal behavior of a person is just one example of abnormalities, such as abnormal activities that may indicate that an attack is in progress or has occurred recently. Any place that abnormal behavior is mentioned, any abnormality and/or abnormal activity may be substituted to obtain other embodiments. Some examples of behavior patterns and effects that may be determined include, but are not limited to, falling down, being unable to walk, falling unconscious, displaying notable duress, coughing, doubling over with cough/discomfort, staggering, being unable to walk straight or normally. Other behavior patterns are discussed below under the heading "Abnormal behaviors related to chemical, biological and/or radiological attacks."

The sensor(s) 102*a-n* may detect activity data, including abnormal behavioral data associated with an attack. The sensor(s) 102*a-n* may detect abnormal behavioral data associated with a biological, chemical and/or radiological attack. The sensor(s) 102*a-n* may be near-range and/or long-range sensors. The sensor(s) 102*a-n* may have visual, audio, and/or thermal sensing abilities, which may determine whether there are any such attacks. In an embodiment, the sensor(s) 102*a-n* can be used to detect behavior patterns of people. The sensors 102*a-n* can be optical (visual), audio, infrared, thermal, chemical/biological/radiological and/or a combination thereof. For example, sensors 102*a-n* may include one or more photo detectors, charge couple devices, optical cameras, infrared sensors, thermal cameras, microphones, chemical detectors, biological detectors, and/or radiological detectors. In some embodiments, combinations of visual and audio or visual and thermal sensors are used to detect behavioral data associated with one or more persons. In some embodiments, audio analysis of the noises, voices, and volume levels, and/or the contents of conversations can also provide additional confirmation of an attack (e.g., duress).

In some embodiments, the sensors 102*a-n* include at least one thermal camera. A thermal camera uses long range electromagnetic waves (long) in the infrared spectrum to collect heat signatures of the objects in the scene. A thermal camera provides a visual output showing a thermal map of the scene. Inanimate objects for instance, have a different heat signature from that of human beings. The thermal signatures of the human beings in the scene can be analyzed to determine deviations from normal human temperatures and/or positions caused by possible exposure to chemical, biological, and/or radiological agents. A thermal camera/sensor can be used as additional validation for duress behaviors detected by other sensors.

In some embodiments, the sensors 102a-n include at least one infrared camera. An infrared camera/sensor uses electromagnetic waves (near) in the infrared spectrum to collect information and form the image/video. The infrared camera/sensor may be used to detect sources of infrared (e.g., any heat source, such as the human body) and can be used for continuous monitoring and analysis of a location. In some embodiments, the sensors 102a-n include at least one visual camera. In an embodiment, a visual color camera/sensor is the primary input used to provide video to analyze people's behavior and patterns. A visual color camera/sensor has the limitation of providing useful video only when there is adequate lighting in the scene in the form of daylight or external lighting. Dark areas and/or outdoor areas (particularly at dusk, dawn or at night) may need an infrared sensor. Optionally, illumination may be provided during the night time or in dark locations.

The sensors 102a-n can be located on subjects or can be located in a place or area where it is believed a chemical, biological, and/or radiological attack may occur. Examples include public places such as bridges, public transportation (e.g., subways, trains), boats, museums, political buildings (e.g., civic centers), convention centers, large buildings (e.g., the Chrysler building, the Empire State building), airplanes, and television studios.

In some embodiments, multiple sensors 102a-n may be correlated to determine three dimensional information, and for determining an overall location information. A map of location and Global Positioning System (GPS) information may be provided for reporting and/or for enabling a timely response to the crisis.

In some embodiments, the data may be gathered from multiple types of sensors 102a-n and hardware system 100 may integrate and/or fuse data gathered from the multiple sensors to identify whether an attack is in progress. In an embodiment, multiple sensors are communicatively connected, such as a color sensor, an infrared sensor, a thermal sensor, and/or a microphone to a processor, so that each provides input to the processor and, as a result, each may provide different types of unique information. A better overall decision may be obtained than were only one sensor or one type of sensor used. There may be a higher level of intelligence that combines the results of the analysis of the output of each of the sensors to produce the final output. Using multiple sensors may add to the reliability and the accuracy and may boost the overall system capabilities.

In some embodiments, multiple devices and/or sensors 102a-n can be configured to track people between sensors. For example, with a building map, adjacent sensors may tag and/or mark a person and/or object in an image, so that the person/object moving from camera 1/sensor 1, will be handed off to camera 2/sensor 2—that is, will be tracked by camera 1/sensor 1 at least until the next sensor e.g., camera 2/sensor 2 starts tracking the moving person/object. The hand off may be facilitated by loading information about each sensor's location and/or current activities. Also movements of people and/or events can be tagged and marked on a map of the building or on a map of a larger region such as a street, city, state, and/or the world. For example, a building map can be displayed with all events shown in an aerial layout. People walking or duress/distress crisis events can be mapped and shown to first responders and security guards headed for a location under attack. For maps of locations larger than a building, GPS coordinates may be used and a map of a wider area, region, or city may be used to display locations of crisis and/or distress.

Communications line(s) 106 communicatively connect sensors 102a-n to at least one processor (for analyzing the data and determining whether an attack is occurring). In an embodiment, instead of, or in addition to, communications line 106, sensors 102a-n may communicate wirelessly with a processor and/or hardware system for detection of chemical, biological and/or radiological attack.

Person 108 may be a lone individual that is monitored or one of many people within a crowd that is monitored by sensor(s) 102a-n to determine whether a biological, chemical and/or radiological attack is occurring. Person 108 is in a normal state (e.g., standing erect). One way of detecting an attack is to monitor the change in behavior of the person 108 to determine whether the behavior is related to a chemical, biological and/or radiological attack. One type of behavior that can be monitored to determine an attack is falling. Person 109 is a person in a state of duress, which may result from an attack. In an embodiment, person 109 is person 108 after an attack. During an attack, person 108 may become person 109.

The computer 110 can receive, monitor, and/or analyze input from the sensor(s) 102a-n to determine if the behavior is consistent with an attack. The computer 110 uses various algorithms to identify whether a behavior is consistent with a chemical, biological and/or radiological attack. In an alternative embodiment, sensor(s) 102a-n may include a processor and memory, which may perform the functions of computer 110. For example, a processor may be located within a sensor (e.g., a processor in a camera box, see also FIG. 8B). The computer 110 can use algorithms to analyze data from one or more sensors to analyze the risks and predict the spreading patterns of the agents. A classification of the type of attack can be performed based on sensor 102a-n data (e.g., visual, thermal, audio, motion, and behavior patterns) and information observed about people.

External systems 112 may include one or more computers, servers, and/or alarms, for example. External systems 112 can be used to alert interested parties if it is determined that an attack has occurred. The external systems 112 and server can allow interaction with hardware system 100 and can provide an interface for a user to interact with and analyze data. The external systems 112 and server can provide the user with information on the behavioral data obtained by the sensor(s). The external system 112 may output events and/or alerts with videos, audio and images for visual or audio confirmation evidence.

The computer 110 and/or external systems 112 may have Ethernet/IP/Wireless connectivity, allowing the hardware system to be a full sensor or appliance deployed on the network. The computing and detection module 110 can be built into the camera, located outside the camera on a small mini box device, or even located on a server at the backend 112. The external system 112 may output events and/or alerts with videos, audio and images for visual or audio confirmation evidence. The external system 112 may alert people and/or other systems on the status of potential attacks. The external system 112 may convey the location, confidence scores, video verification/evidence, date/time information, and/or other reports. The external system 112 may provide reports based on data collected from the at least one server. Other reports on behavior analysis, statistics, and people counts, for example, may be published.

The external system 112 may detect, monitor and/or alert an interested party of the onset and occurrence of a chemical, biological and/or radiological attack. In the specification, the term "interested party" includes any entity or person that may have an interest in knowing about the occurrence of a chemical, biological and/or radiological attack, including, but not limited to, police, security personnel, armed services personnel, government personnel, medical personnel, and/or emergency personnel. The entity that may have an interest in knowing about the occurrence of a chemical, biological and/or radiological attack, includes anyone involved in an emergency management agency (local or national), FBI, CIA, Homeland Security, police department, fire department, emergency services, disaster management services and hospital services. In some embodiments, an interested party can be a person (or persons) who is designated to review output information and to follow up. Following up may include reviewing the data, rechecking the data, following up with one or more further interested parties, ending the alarm, initiating an alarm, and/or deciding to continue monitoring the area, sending assistance, and/or sending the police.

Figure 2A:
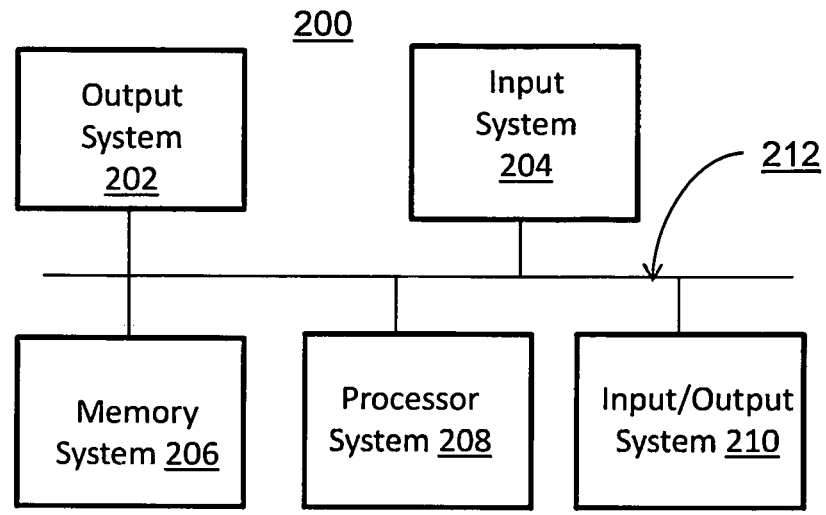
FIG. 2A shows a block diagram of an embodiment of a computer system that may be incorporated within the system of FIG. 1.

FIG. 2A shows a block diagram of a system 200 which may be incorporated within hardware system 100 of FIG. 1. System 200 may include output system 202, input system 204, memory system 206, processor system 208, input/output device 210 and communications system 212. In other embodiments, system 200 may include additional components and/or may not include all of the components listed above.

Hardware system 200 may be an embodiment of computer 110. Alternatively or additionally, system 200 may be an embodiment of a hardware system 100 for detection of chemical, biological and/or radiological attacks in which the chemical, biological, and/or radiological attack detection system 200 is contained within one unit.

Output system 202 may include any one of, some of, any combination of, or all of a monitor system, a handheld display system, a printer system, a speaker system, a connection or interface system to a sound system, an interface system to peripheral devices and/or a connection and/or interface system to a computer system, intranet, and/or internet, for example. Output system 202 may include lights, such as a red light and/or a flashing light to indicate an attack. Output system may include a siren, speaker, or other alarm that may produce sounds such as beeps, rings, buzzes, sirens, a voice message, and/or other noises. Output system may send electronic alerts via network or wireless. Output system may send event information, image/video, and details via a local area network, wide area network, or wireless network. Output system may send video messages via an internal video, close circuit TV or TV. Output system may send an audio message via a phone, pager, fax, mobile phone network, or ordinary phone network. Output system may include recording a log and report internally in a database or event log. Output system may include mobile SMS or MMS or pager sent to external people, security guards, and/or medical people. Output system 202 or a part of output system 202 may be kept in the possession of an interested party or in a location that will catch the interested party's attention, such as a PDA, cell phone, and/or a monitor of a computer that is viewed by an interested party. Output system 202 may send an e-mail, make a phone call, and/or send other forms of messages to alert further concerned parties about the occurrence of an attack.

Input system 204 may include any one of, some of, any combination of, or all of a keyboard system, a mouse system, a track ball system, a track pad system, buttons on a handheld system, a scanner system, a microphone system, a connection to a sound system, and/or a connection and/or interface system to a computer system, intranet, and/or internet (e.g., IrDA, USB), for example. Input system 204 may include a camera and/or audio sensor for detecting abnormal behavior and/or duress. Input system 204 or a part of input system 204 may be kept in the possession of a care taker or in a location easily accessible to a concerned party so that the concerned party may request current behavior information and/or past behavior information and/or attack information. For example, input system 204 may include an interface for receiving messages from a PDA or cell phone or may include a PDA and/or cell phone.

Memory system 206 may include, for example, any one of, some of, any combination of, or all of a long term storage system, such as a hard drive; a short term storage system, such as random access memory; a removable storage system, such as a floppy drive or a removable drive; and/or flash memory. Memory system 206 may include one or more machine-readable mediums that may store a variety of different types of information. The term machine-readable medium is used to refer to any medium capable of carrying information that is readable by a machine. One example of a machine-readable medium is a computer-readable medium. Memory system 206 may store attack detection information and/or information about chemical, biological, and/or radiological attacks, such as characteristics of an attack and/or may store algorithms for detecting an attack. Memory system 206 will be discussed further in conjunction with FIG. 2B.

Processor system 208 may include any one of, some of, any combination of, or all of multiple parallel processors, a single processor, a system of processors having one or more central processors and/or one or more specialized processors dedicated to specific tasks. Optionally processor system 208 may include a neural network. Optionally, processor system 208 may be configured as a vector machine (e.g., which handles multiple repetitive steps as one parallel computation) and/or may include a massively-parallel processing system (in contrast to a vector machine, a non vector machine may ordinarily perform the same computation using a loop that repeats the same or a similar calculation each time the loop repeats another cycle). Processor system 208 may run a program stored on memory system 206 for detecting chemical, biological, and/or radiological attacks. Processor system 208 may implement the algorithm of abnormal behavior and or chemical, biological, and/or radiological attack of chemical, biological, and/or radiological attack system 200. Processor system 208 may include one or more Digital Signal Processors (DSPs) in addition to or in place of one or more Central Processing Units (CPUs) and/or may have one or more digital signal processing programs that run on one or more CPU.

Communications system 212 communicatively links output system 202, input system 204, memory system 206, processor system 208, and/or input/output system 210 to each other. Communications system 212 may include any one of, some of, any combination of, or all of electrical cables, fiber optic cables, and/or means of sending signals through air or water (e.g. wireless communications), or the like. Some examples of means of sending signals through air and/or water include systems for transmitting electromagnetic waves such as infrared and/or radio waves and/or systems for sending sound waves.

Input/output system 210 may include devices that have the dual function as input and output devices. For example, input/output system 210 may include one or more touch sensitive screens, which display an image and therefore are an output device and accept input when the screens are pressed by a finger or stylus, for example. The touch sensitive screens may be sensitive to heat and/or pressure. One or more of the input/output devices may be sensitive to a voltage or current produced by a stylus, for example. Input/output system 210 is optional, and may be used in addition to or in place of output system 202 and/or input device 204.

Figure 2B:
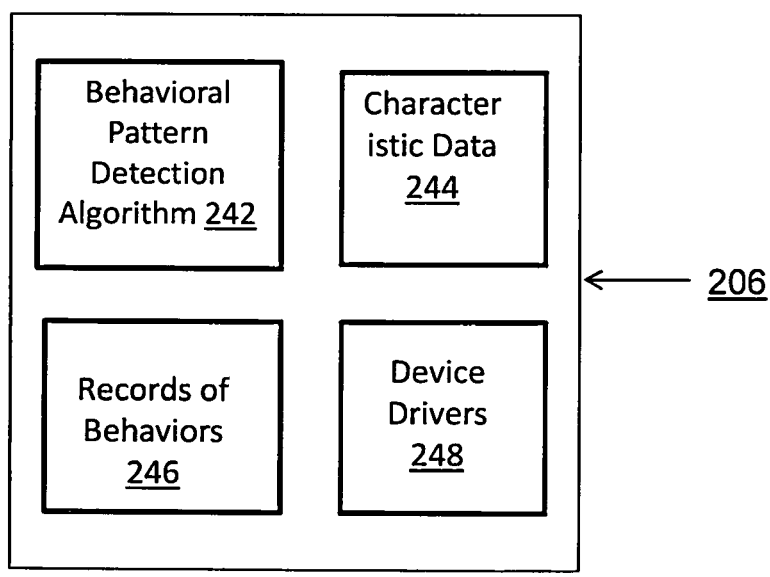
FIG. 2B shows a block diagram of an embodiment of a memory system of FIG. 2.

FIG. 2B shows a block diagram of an embodiment of memory system 206. Memory system 206 may include behavioral detection algorithm 242, characteristic behavioral data 244, records on past behaviors during attacks 246, and device drivers 248. In other embodiments, memory system 206 may include additional components and/or may not include all of the components listed above.

Behavior detection algorithm 242 analyzes motion, thermal, and/or audio data to determine whether an attack has occurred. Characteristic behavioral data 244 includes information characterizing a chemical, biological and/or radiological attack.

Characteristic behavioral data 244 may include data about characteristic behaviors obtained by studying past attacks. Characteristic behavioral data 244 may include data that characteristic of duress, such as thresholds (a volume and/or motion threshold), and/or patterns in data that are indicative of an attack (see also the section entitled "Abnormal behaviors related to chemical, biological, and/or radiological attacks"). Characteristic behavioral data 244 may include default data that is not specific to any one individual 108 and/or may include data that is specific to a group of individuals.

Records of past behaviors 246 may store information about behaviors as attacks are happening, which may be reviewed further at a later date to better determine the characteristics of the attacks that are specific to various individuals 108 so that system 100 may more reliably detect attacks related to the behaviors of one or more individuals. Additionally or alternatively, records of past behaviors 246 may be used for identifying the type of attack as chemical, biological and/or radiological and/or can be used to identify the specific agent of the attack. The specific agent may include the type of chemical, the type of biological and/or the type of radiological agent that is used in the attack. In an embodiment, all detection results may be recorded in a form of long term memory, such as on the hard disk of a PC or on an external memory card (SD, Compact Flash, Memstick etc). Device drivers 248 include software for interfacing and/or controlling the sensors and/or other peripheral devices.

Algorithms for Visual and Activity (e.g., Abnormal Behavior) Analysis

The abnormal behavior detection algorithm is one component of the overall system. The algorithm may be used to analyze data from various sensors to determine if a behavior characteristic of an attack has occurred. Behavioral detection can use one or more of at least three types of algorithms:

1: Background-foreground based algorithms. Background-foreground algorithms may include but are not limited to, a dimension based algorithm, determining the size of the person, determining the shape of the person and/or other object, determining the width, and/or length of the person, determining a bounding box, determining aspect ratio of the person or bounding box, and/or another algorithm. Other types of background foreground based algorithms include motion-based algorithms, and combination of size, motion, and/or shape based algorithms. In the dimension base algorithm prior knowledge of where the person or movements of the object of interest are expected to enter the view of the camera or scene is used to aid identifying the person or object of interest. Also, knowledge of the expected location, location, and dimensions of the person or object of interest may be used to identify the person or object of interest. In an embodiment, the average size and dimensions of a person are used as the expected size of the person, and the dimensions and also uses the expected person's position with average person size, width and height. Using the average person's dimensions and expected position, the system can calculate the approximate foreground or movement of a person, and extract the person or foreground from the background.

2: Feature points and non-background-foreground based algorithms. These algorithms can include but are not limited to, methods in which many points (e.g., feature points or points of interest) are selected and the motion of the points is tracked.

3: Shape and pattern-recognition based algorithms. Shape and pattern-recognition based algorithms may include algorithms for recognizing patterns in optical, thermal and/or audio data indicative of an attack. The pattern recognition based algorithm may include a thermal analysis and/or audio analysis. For example, the pattern based algorithm may analyze the pattern of pixels to determine if the pattern has one or more characteristics of a person or crowd under duress.

Methods

The methods may involve detection of a chemical, biological, and/or radiological attack, by collecting data related to behavior associated with one or more persons and analyzing the data collected to determine one or more values characterizing the behavior. In some embodiments, the data is compared to one or more values characterizing behavior of one or more persons during a chemical, biological or radiological attack. This is one way of determining whether an attack has occurred based on the comparing. The result of the methods can be to activate an alert that an attack has occurred if as a result of the determining it is determined that an attack has occurred. In either case, a decision can be made to continue monitoring. In some embodiments, the data is collected via a camera, a thermal camera, or an audio sensor. In some embodiments, the behavior is characterized as related to an attack based on the algorithms discussed herein. In some embodiments, the activating of the alert includes at least sending a message indicating that an attack has occurred to a device associated with a concerned party. Embodiments of the methods can be found in FIGS. 3A-7 and 13.

The methods use one or more sensors that can have visual, audio, and/or thermal sensing abilities and can use algorithms to determine by behavior patterns of people whether there has been a chemical, biological and/or radiological attack. One aspect of an embodiment of the system includes a sensor that measures behavioral data associated with one or more persons; an alarm system; a processor; a memory storing one or more machine instructions, which when implemented cause the processor system to perform a method including at least analyzing the data, determining whether the behavioral data indicates an attack has occurred based on the analyzing; if the determining results in a determination that an attack has occurred, sending a signal to the alarm system that causes an alert to be sent. In some embodiments hardware system 100 is for the detection of a chemical, biological and/or radiological attack. In some embodiments, the sensor includes at least a plurality of cameras and audio sensors. In some embodiments, the sensor includes at least a plurality of infrared and/or thermal cameras. In some embodiments, the sensor includes a plurality of cameras and audio sensors. In some embodiments, the method further includes at least learning a background, separating a foreground from a background, capturing data, establishing a bounding box, establishing an aspect ratio of a person in the bounding box, identifying a change in the aspect ratio, determining whether an abnormal behavior is occurring based on a learning algorithm of abnormal behavior, and if the abnormal behavior is occurring, sending an alert to at least one interested party, wherein said abnormal behavior is associated with a chemical, biological and/or radiological attack.

Figure 3A:
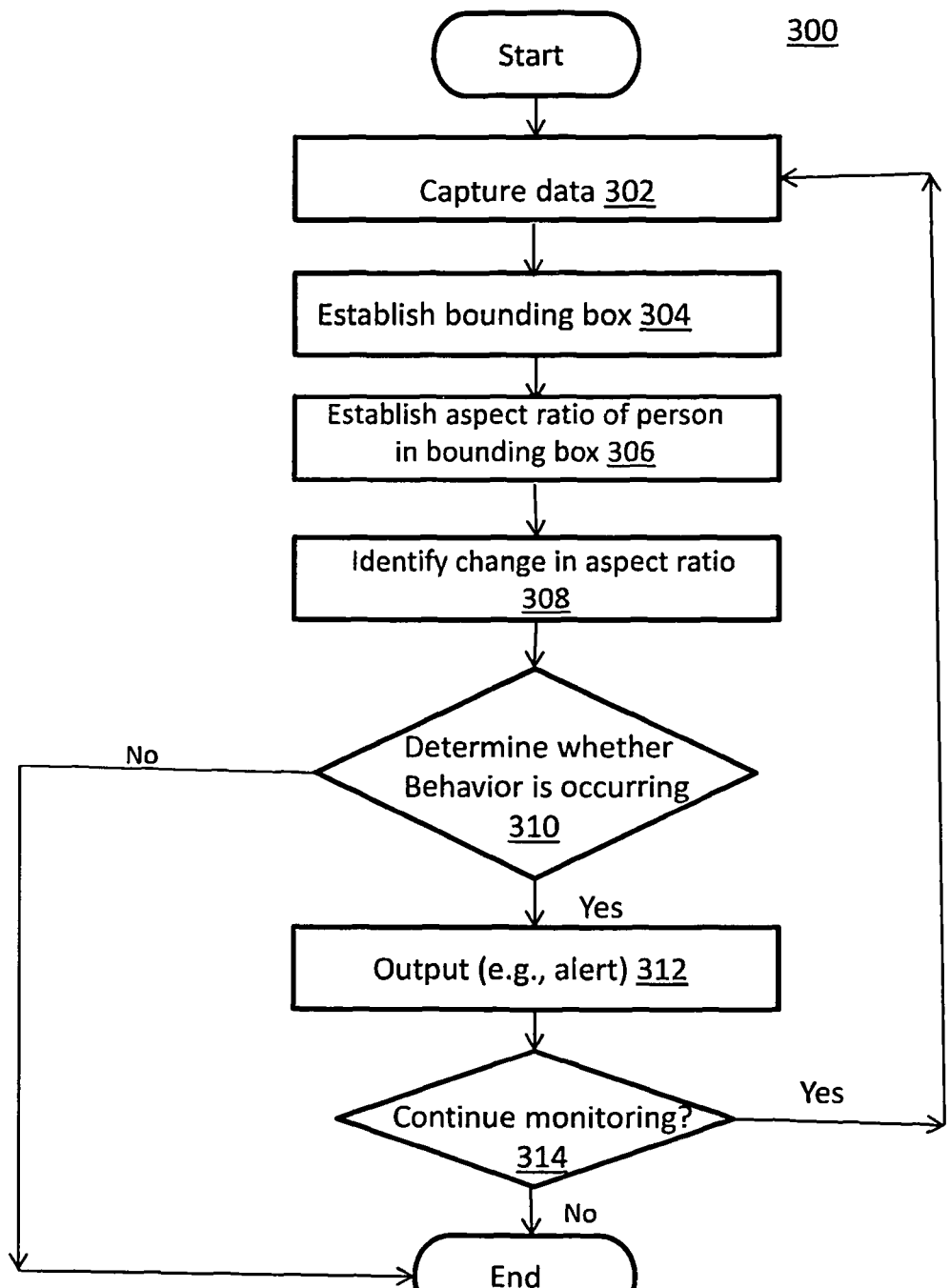
FIG. 3A shows is a flowchart of an embodiment of a method of detecting attacks, based on background foreground based algorithms.
Figure 3B:
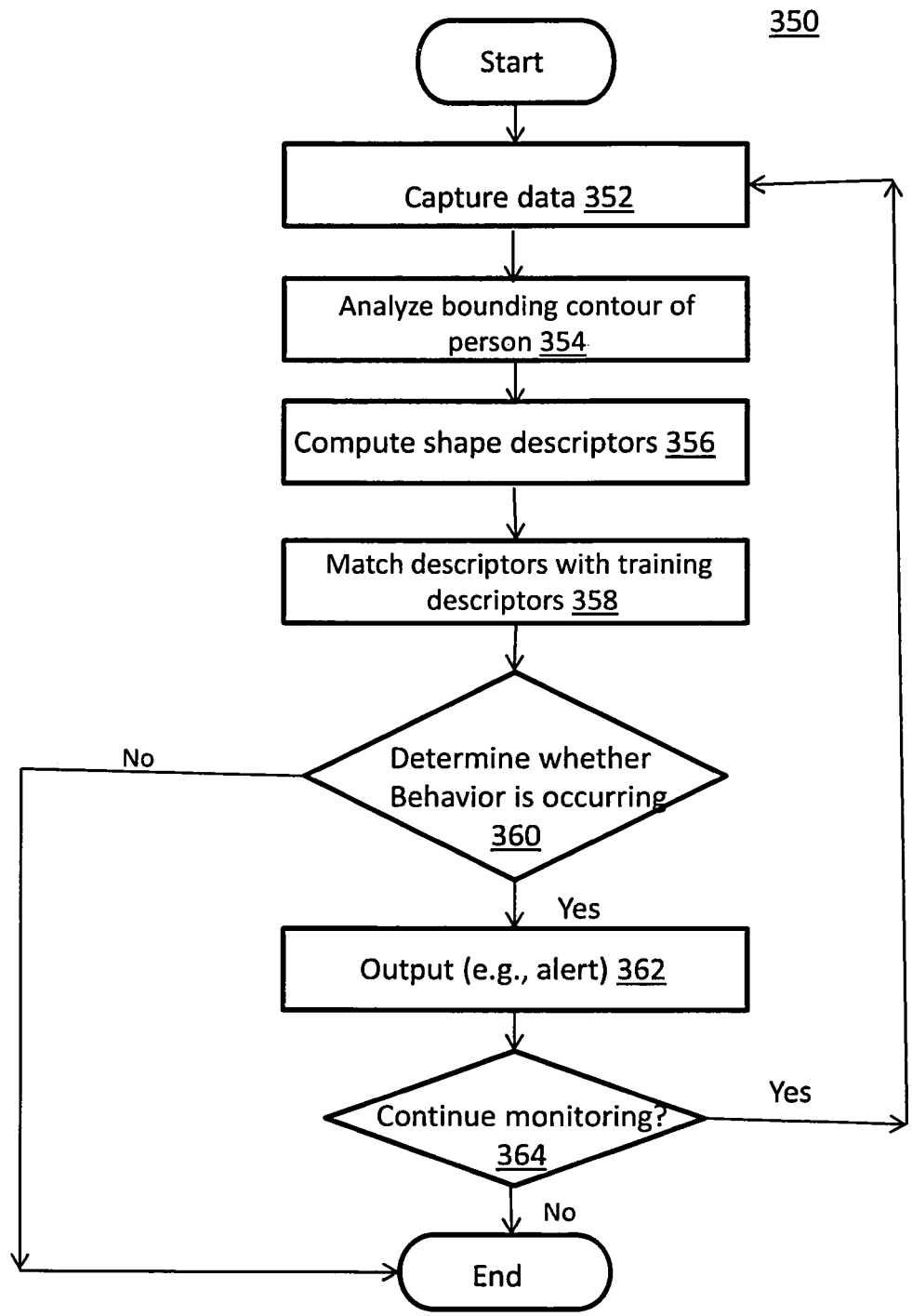
FIG. 3B shows a flowchart of an embodiment of a method of detecting attacks, based on background foreground based algorithms.

In some embodiments, the method further includes at least learning a background, separating a foreground from the background, capturing data, analyzing a bounding contour of a person, computing shape descriptors (e.g., using a curvature scale space method, moment invariants, Fourier descriptors, and/or Hausdorff distance, see also description of FIG. 3B for explanation of shape descriptors), matching the shape descriptors with training descriptors, determining whether an abnormal behavior is occurring based on the matching, and if the abnormal behavior is occurring, sending an alert to at least one interested party, wherein said abnormal behavior is associated with an attack. Shape descriptors may be mathematical summary of the object or person, where in the case the shape descriptors will include person size, height, width, profile silhouette, color, velocity, direction, unique features on the body, edges, gradient histograms, overall edge and profile histograms etc. The shape descriptors may be mathematical or geometry based shaped summary. Shape descriptors may be a person's profile or silhouette expressed as a contour of points, or may be gradients at the edges of the profile or silhouette. The shape gradients, edge summary, or a description of person geometric summary, such as the person's height, width, and/or aspect ratio. It can also be a combination or hybrid of these mathematical summary or descriptors or the person shape. For example, a fallen person vs. a standing person, or bending person will have a different shape descriptors (e.g., with different profile points and different gradients), because the above mathematical shape summary will be different. An example of shape descriptor is 'shape context'. Here N points are selected on the shape contour and for each point, the relative vectors to the remaining N−1 points are used as descriptors. This is followed by computing a histogram of these vectors for robustness.

In some embodiments, the algorithm includes: capturing data, selecting feature points on a person or scene, identifying objects by clustering of points, identifying movement or a change of the points, activate machine learning, determining whether an abnormal behavior is occurring based on the machine learning algorithm of abnormal behavior, and if the abnormal behavior is occurring, sending an alert to at least one interested party, wherein said abnormal behavior is associated with a chemical, biological and/or radiological attack. In some embodiments, the algorithm includes capturing data in the form of pixels, looking at the pattern of pixels captured, comparing to a learning algorithm, determining whether an abnormal behavior is occurring based on the learning algorithm of abnormal behavior, and if the abnormal behavior is occurring, sending an alert to at least one interested party, wherein said abnormal behavior is associated with a chemical, biological and/or radiological attack. In some embodiments, the algorithm includes capturing data, identifying a blob of heat activity, analyzing body heat of one or more persons, identifying a change in body heat, determining whether an abnormal behavior is occurring based on a learning algorithm of abnormal behavior related to body heat, and if the abnormal behavior is occurring, sending an alert to at least one interested party, wherein said abnormal behavior is associated with a chemical, biological and/or radiological attack.

In some embodiments, hardware system 100 further comprises capturing data, identifying background noise, identifying a signal of interest, identifying known categories of audio duress, determining whether duress is occurring based on a learning algorithm of duress, and if the abnormal behavior is occurring, sending an alert to at least one interested party, wherein said abnormal behavior is associated with a chemical, biological and/or radiological attack. In some embodiments, the processor is located within the sensor. In some embodiments, the processor is located within a camera.

Further aspects of the hardware system 100 include a system for the detection of a chemical, biological and/or radiological attack, including, an input system for inputting attack detection parameters; a visual, thermal or audio sensor for measuring behavior data; a transmitter for transmitting the behavior data to a remote unit; a housing for enclosing the sensor and the transmitter; and a remote unit, which is a unit remote from the sensor, including at least a receiver for receiving behavior data from the sensor; a memory for storing attack characteristics, and an algorithm for analyzing the behavioral data measured, and determining whether to send an alert based on the comparing; a processor that implements the algorithm and causes the transmitter to transmit the alert based on the algorithm; and a transmitter that transmits the alert in response to signals received from the processor resulting from the processor determining that an attack occurred based on the processor implementing the algorithm, attack settings and status information for display on the housing. In some embodiments, hardware system 100 further includes an external systems and server unit, a display being attached to the external systems unit for displaying attack settings and status information, and the input system being attached to the external systems unit in a manner in which the attack settings may be entered by a person.

Further aspects of the hardware system 100 include a method for detection of a chemical, biological and/or radiological attack, comprising: collecting data related to behavior associated with one or more persons; analyzing the data collected to determine one or more values characterizing the behavior; comparing the one or more values characterizing the behavior of one or more values characterizing behavior of one or more persons during a chemical, biological or radiological attack; determining whether an attack has occurred based on the comparing; and activating an alert that an attack has occurred, if as a result of the determining it is determined that an attack has occurred, wherein the data is collected via a camera, a thermal camera, or an audio sensor. In some embodiments, the activating of the alert includes at least sending a message indicating that an attack has occurred to a device associated with a concerned party.

Embodiments of the methods and algorithms used therein are now described with reference to FIGS. 3A-7 and 13.

A. Background Foreground Based Algorithms

FIGS. 3A and 3B are flowcharts showing embodiments of methods 300 and 350 of detecting an attack, based on background foreground based algorithms. Distinguishing between background and foreground may be used to separate the foreground objects from the background. An adaptive and/or continuous background learning algorithm can be used to learn the background. Foreground objects can then be detected once the background is known. FIG. 3A shows an embodiment of method 300, which is a background foreground based algorithm that uses the size of the person, ratios, bounding box and dimension-based algorithms. In this embodiment, a sensor (e.g., a camera) can be placed such that the aspect ratio of the person in the scene changes significantly upon a behavioral event associated with a chemical, biological and/or radiological attack (e.g., a fall). A fall may then be detected by sensing the change in the aspect ratio of a geometric object associated with the person. For example, a bounding box may be established within which the image of a person fits. Objects (e.g., the bounding box) may be detected and tracked. When a person falls, the bounding box around the person changes its aspect ratio. The algorithm can also check for changes in a person's height, and for fall and duress signals. Using the information determined from changes in the bounding box or person's size dimensions, a fall event may be determined with a a low false alarm rate. Hence, in this method the gross/total size, aspect and other ratios, overall sizes, dimensions, etc. are measured and analyzed. For a dimension based algorithm, the algorithm determines prior knowledge of where the person or movements are expected to enter the camera view or scene. Based on the expected dimensions of the location and based on the expected person's position and an average person's size, width, height (of the characteristics of the expected foregrapnd) and/or other dimensions, the system can identify the person, and the system can then calculate the approximate Foreground or person movement and extraction.

In step 302, data is captured using one or more sensors (e.g., one or more cameras). The one or more sensor(s) can include any sensor discussed herein including any type of camera, a speaker, and/or a motion detector.

In step 304 a bounding box is established in which a person fits. The bounding box can be the smallest box that an object of interest fits into.

An aspect ratio of the person in the bounding box is established in step 306. An aspect ratio is the ratio of the dimensions of a person or object. For example, an aspect ratio of the width to the height or the height to the width of a person or object.

In step 308 a change in the aspect ratio is identified. For example, when a person falls, the bounding box around the person changes its aspect ratio 308. Alternatively, the algorithm can check for person height changes. Alternatively, or in addition, the aspect ratio of the bounding box can be monitored after the event (e.g., the fall).

In step 310, a determination is made based on the bounding box data whether the behavior associated with a chemical, biological, and/or radiological attack is occurring. For example, using a person falling as an example of a behavior associated with a chemical, biological and/or radiological attack, and with reference to FIG. 1, one aspect ratio represents a person standing 108. A different aspect ratio represents a person lying down 109 and a different aspect ratio represents a person curled up on the floor (e.g., a square). Certain aspect ratios (the ratios indicative of a person lying down or curled up) are indicative of a problem. If there is no behavior that is indicative of an attack, the iteration of the method ends. However, the method may continue to operate.

With reference to FIG. 3A, in step 312, if it is determined that an attack is occurring (e.g., "yes"), an output is activated (e.g., an alert is sent). Any type of output that is discussed herein can occur, including an alert sent to an interested party via email and/or an alarm may go off in the area where the attack is occurring. If it is determined that an attack is not occurring, a decision can be made to stop and/or to continue monitoring.

In step 314, a decision is made as to whether to continue monitoring or to stop. If monitoring is continued, the method 300 is repeated for each set of data until the camera and/or the processor are turned off.

In some embodiments, each of the steps of method 300 is a distinct step. In other embodiments, although depicted as distinct steps in FIG. 3A, the steps may not be distinct steps. In other embodiments, the method 300 may not have all of the above steps and/or may have other steps in addition to or instead of those listed above. The steps of the method 300 may be performed in another order. Subsets of the steps listed above as part of the method 300 may be used to form their own method.

FIG. 3B is a flowchart of an embodiment of a method 350 using a background foreground based algorithm that uses a another shape-based algorithm. Method 350 may be used when a person's dimensions are not appropriate for determining an attack and/or the bounding box method is not appropriate. This, could occur if the person or the aspect ratio of a bounding box or other bounding geometric object of a fall does not differ significantly from the aspect ratio of the person in other positions. Alternatively a bounding box method and/or a method based on the person's dimension may not be appropriate if the aspect ratio of the bounding box or other bounding geometric object does not differ significantly when the person is in other positions. In step 352, data is captured using one or more sensors (e.g., two or more cameras). The sensor can be any sensor discussed herein including any type of camera, a speaker, and/or a motion detector. A bounding contour of the person is analyzed in step 354, and the shape descriptors are computed for the contour in step 356. The shape descriptor can be local or global. Examples of shape descriptors may include but are not limited to, Curvature Scale Space approach, Moment Invariants, Fourier Descriptors, and Hausdorff distance. The shape descriptors are mathematical and/or geometry based shape summaries of characteristics of the shape. For example, a shape descriptor can be a person's profile silhouette expressed as contour points, gradients at the edges of a histogram of the entire person, shape gradients, or edge summary. Other examples of shape descriptors are a mathematical description of a person's geometry and/or shape, such as the person's height, width, aspect ratio, and/or other description of a person's shape. Combinations and/or hybrids of the above mathematical descriptions may also be sued as shape descriptions. For example a fallen person compared to a standing person or a bending person will all have different shape descriptors (profile points and gradients) since these above mathematical shape summary will be different. An example of a shape descriptor is 'shape context'. Here N points are selected on the shape contour and for each point, the relative vectors to the remaining N−1 points are used as descriptors. This is followed by computing a histogram of these vectors for robustness. For example, in image processing, computer vision and related fields, an image moment is a certain particular weighted average (moment) of the image pixels' intensities, or a function of such moments, usually chosen to have some attractive property or interpretation. Image moments are useful to describe objects after segmentation. Simple properties of the image which are found via image moments include area (or total intensity), its centroid and information about its orientation.

Curvature Scale Space (CSS) methods involve computing a curvature function for the contour at different widths (scales). In other words, the curvature function may be smoothed by convolving the curvature with Gaussian kernels of increasing width (or scale). A CSS image is formed by plotting the zero-crossings of the curvature function across successive scales. The successively smoothed curvature function is plotted, and wherever the smoothed curvature function crosses the x-axis (i.e. changes sign) are the points of zero-crossings. The maxima of the contours thus formed are used as the shape descriptor.

Moment Invariants are statistical moment functions computed from the contour points of the curve, which have been normalized in a certain way to achieve invariance under a suitable group of transformations, such as similarity invariant or affine invariant.

Fourier descriptors are the Fourier coefficients that are characteristic of a type of motion or shape. The contour may be described by a function in the complex plane, such as $s(k)=X(k)+jY(k)$, by taking the Fourier transform of the function describing the countour. A Fourier transform of this function is computed which is the Fourier Descriptor. Lower order coefficients of these descriptors are usually used for matching.

Hausdorff distance is the maximum distance of a set of points (e.g., on a curve) to the nearest point in another set of points (e.g., on another curve). The Hausdorff distance can be computed after the curves have been normalized appropriately. Hausdorff distance does not take into account the geometric transformation, such as translations and rotations, relating the two curves. A noromlaizaiton is introduced to reduce, minimize, or remove the contribution of the geometric transformations. For example, before computing the Hausdorff distance, the normalization may be to align the two curves, and then compute the Hausdorff distance. A normalization can be chosen to remove more general transformations such as affine and rigid transformations.

Objects and/or the state of the object can be identified by matching Hausdorff distances in an image with expected Hausdorff distances of the object.

These descriptors are then matched with a training set of descriptors corresponding to known fall events 358. The matching and training can be categorized as a supervised machine learning approach. The shape descriptor curvature scale space approach is used for curve or contour matching. A contour may be successively blurred by convolving it with Gaussian kernels by increasing the standard deviation (e.g., the sigma). The curve "evolves" at successive scales. Curvature zero-crossings at each scale are located and stored and they correspond to interest points in the original contour of the object. These points serve as the features for matching two contours.

Regarding the shape descriptor 358 Hausdorff distance, if A is a group of points, and B is a group of points. The directed Hausdorff distance, $h(A,B)$ is the maximum distance between a point in A and its nearest neighbor in B. Then, the Hausdorff distance $H(A,B)$ is computed as: $H(A,B)=\max(h(A,B), h(B,A))$. Other algorithms can be used including motion based algorithms. Motion based algorithms analyze the motion (e.g., the change between frames or as a function of time in the location of corresponding pixels representing the same portion of an object of interest) to determine if the motion associated with someone (or something) is abnormal, which may indicate that the person is behaving in an abnormal manner. The motion history of an object offers important information about the current state of the object. The motion trajectory of an object can be computed, because the tracking ability for each object may be determined. After a fall event, often the person does not move significantly and the trajectory remains static. The lack of motion offers an important clue for the possibility of a fall event and can be validated further, using simple time based methods or shape based methods. Size-based algorithms analyze the size of people to determine if someone is behaving in an abnormal manner (e.g. if a person is too short, it may be because they have fallen over or fainted). Shape-based algorithms can analyze the shape of someone to determine if that person is behaving in an abnormal manner. (e.g., if the shape of a bounding box is a rectangle lying down, there may be something wrong).

Other algorithms can be used including a combination of size, motion and shape based algorithms/methods. Motion history, size/ratios, and shape based methods can be combined intelligently to give a robust and accurate fall detector. The algorithms can also be used to calculate other abnormal events, such as speeding, no activity, loitering, abnormal path, stopped/waiting, crowd events. Crowd events may include a region that is more crowded or less crowded than that region normally is at the time of being observed; a group of people forming a specific shape, such as a line, circle, or rectangle; a group of people forming a circle, rectangle or partial circle or rectangle, with a smaller group of people (e.g., one, two, three, or four people that are being observed) near the focus of the circle, rectangle, or other shape; and/or a group of people huddling together.

In step 360, a determination is made based on the bounding box data whether the behavior associated with a chemical, biological, and/or radiological attack is occurring.

In step 362, if it is determined that an attack is occurring or has occurred, an output (e.g., alert) 362 is initiated. Any type of output that is discussed herein can be initiated, such as an alert sent to an interested party via email and/or an alarm may go off in the area where the attack is occurring. If it is determined that an attack is not occurring, a decision can be made to stop or to continue monitoring.

In step 364, a decision is made as to whether to continue monitoring or to stop. If it is determined to continue monitoring, the method 350 is repeated for each set of data until the camera and/or the processor is turned off.

In some embodiments, each of the steps of the method 350 is a distinct step. In other embodiments, although depicted as distinct steps in FIG. 3B, the steps may not be distinct steps. In other embodiments, the method 350 may not have all of the above steps and/or may have other steps in addition to or instead of those listed above. The steps of the method 350 may be performed in another order. Subsets of the steps listed above as part of the method 350 may be used to form their own method.

B. Feature Points and Non-Background-Foreground Based Algorithms

Many times it is not feasible to learn the background of the scene and hence separate the foreground from background. In such cases, feature-point tracking based approaches may be employed.

Figure 4:
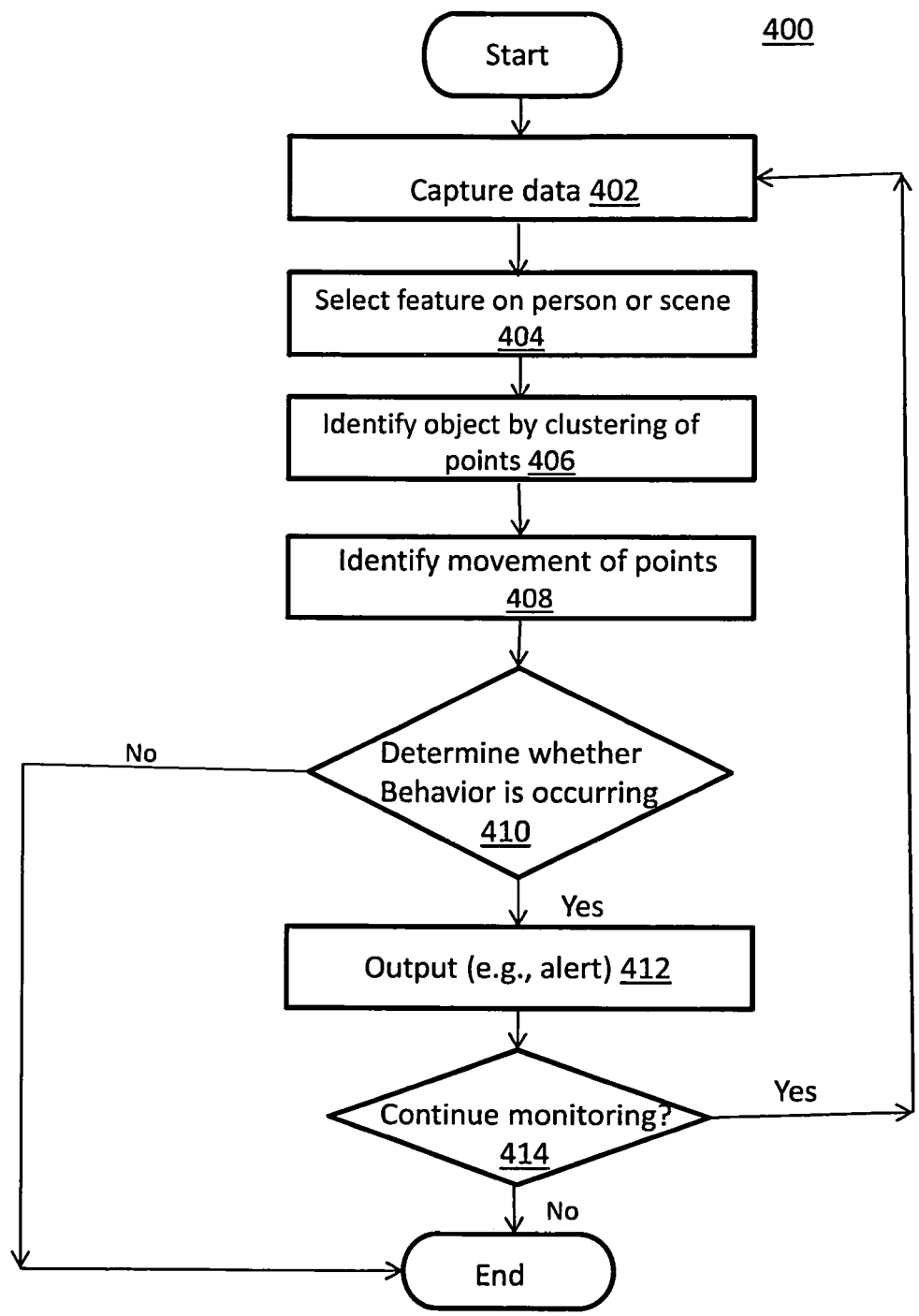
FIG. 4 shows a flowchart of an embodiment of a method of detecting attacks, based on feature points and non background-foreground-based algorithms.

FIG. 4 is a flowchart of an embodiment of a method 400 of a feature points based algorithm. In step 402, data can be captured using one or more sensors. The sensor can be any sensor discussed herein including any type of camera, a microphone, and/or a motion detector.

In step 404, the optical flow of each feature point in the scene may be computed. Any type of feature points or points of interest can be selected on the person or scene.

In step 406, the points are clustered to identify an object or person. The points may be clustered by motion vector similarity and distance proximity. The scene can be analyzed to determine which points tend to cluster together. A group of points that tends to cluster together is identified as an object (or person), and the clustering, indicates objects in the scene.

In step 408, the motion history can be identified by identifying movement of points. In some embodiments, a shape based approach may be used.

In step 410, a determination is made as to whether an abnormal behavior is occurring. An abnormal behavior, such as a fall event, associated with an attack may be identified as follows. Clusters of points may be analyzed to determine whether the events that are transpiring are the events that are indicative of an attack (and therefore need to be detected).

Groups of points are analyzed from image to image. Analysis of groups of points may include (but is not limited to) determining segmentation (determining whether two groups of points are two segments of the same object), grouping (determining points that tend to move together and therefore may be grouped together), speed, and acceleration/deceleration, the path of the points, the shrinking of a group of points, height change/drop of these feature points, the expanding of a group of points. A determination may be made whether the group of points is the rising or falling, moving or stopping, jumping or normal, and straight or curved path. All these shape and motion and movement analyses can be performed on the points (e.g., the points which are located on the person's body). Certain motions are characteristic of an attack (e.g., fall events).

Alternatively, optical flow of the moving points may be another indication of a fall or of duress. Motion vectors of feature points experiencing the fall event are usually different from the motion vector of other "normal" feature points. Motion vectors may be classified into fall events and other events. The classification of motion vectors may be learned either using a supervised or un-supervised machine learning algorithm. Classifying motion vectors as a fall, a duress event or another event may be performed whether or not the scene can be separated into background and foreground using background learning. Analysis of motion vectors of feature points may yield information that is complementary to information gleaned from other methods described above. This is also used to calculate other abnormal events, such as speeding, no activity, loitering, traveling in an abnormal path, an objected that has stopped/or is waiting, people vacating a location, and/or people aggregating about a location.

Using machine learning, fall events may be classified. Machine learning mechanisms may include neural networks, Bayesian net, or Hidden Markov Models (HMM), for example.

The Hidden Markov Model (HMM) is another motion based approach for detecting abnormal motion. Elaborate HMMs can be derived for feature points that do not experience any fall event and feature points that experience a fall event. During the detection time, if there is a significant cluster of feature points that exhibits behaviors corresponding to a fall-event or if another event indicative of duress occurs, an attack can be indicated as likely to have occurred. In probability theory, a Markov model is a stochastic model that assumes the Markov property. Generally, the Markov property assumption enables reasoning and computation with the model that would otherwise be intractable. A stochastic process has the Markov property if the conditional probability distribution of future states of the process depend only upon the present state; that is, given the present, the future does not depend on the past. A process with this property is called Markov process. The term strong Markov property is similar to this, except that the meaning of "present" is defined in terms of a certain type of random variable known as a stopping time. A stopping time with respect to a sequence of random variables $X_1$, $X_2$, (e.g., the location of pixels in a frame) is a random variable $\tau$ with the property that for each t, the occurrence or non-occurrence of the event at time $\tau=t$ depends only on the values of $X_1$, $X_2$, . . . , $X_t$. A Markov random field, extends this property to 2 or more dimensions (e.g., the image place of the picture from a camera or the space represented by the image), or to random variables defined for an interconnected network of items. Both the terms "Markov property" and "strong Markov property" have been used in connection with a particular "memoryless" property of the exponential distribution. A hidden Markov model (HMM) is a statistical model in which the system being modeled is assumed to be a Markov process with an unobserved state. A HMM can be considered as the simplest dynamic Bayesian network. In a regular Markov model, the state is directly visible to the observer, and therefore the state transition probabilities are the only parameters. In a hidden Markov model, the state (e.g., the state of the crowd, whether normal or under duress) is not directly visible, but output, dependent on the state (such as visual cues), is visible. Each state has a probability distribution over the possible output tokens (e.g., the set of pixel values of the image). Therefore the sequence of tokens generated by an HMM gives some information about the sequence of states (e.g., the progression of the degree of duress of the crowd). Note that the adjective 'hidden' refers to the state sequence through which the model passes, not to the parameters of the model; even if the model parameters are known exactly, the model is still 'hidden'.

A Bayesian network, or directed acyclic graphical model is a probabilistic graphical model that represents a set of random variables and their conditional independencies via a directed acyclic graph (DAG), which is a graph with no cycles. For example, a Bayesian network could represent the probabilistic relationships between a degree to which a crowd is under duress and symptoms or visual cues of duress. Given the symptoms, the network can be used to compute the probabilities of the presence or degree of duress. Formally, Bayesian networks are directed acyclic graphs whose nodes represent random variables in the Bayesian sense: the nodes may be observable quantities, such as the color and/or pattern of pixels and the latent variables, unknown parameters or hypotheses, such as the degree of duress had the relation of the degree of duress to the pattern of pixels. Edges (the connections that join the nodes) of the graph represent conditional dependencies; nodes that are not connected represent variables that are conditionally independent of each other. For example, each point on an image may be represented by a node, and those that are part of the same cluster of points (e.g., a first cluster) that may be associated with the same portion of a body may be connected via edges and those clusters of points that represent parts of a different person (that moves independently of the first person) may not have any edges that connect to the first cluster of points. Each node is associated with a probability function that takes as input a particular set of values for the node's parent variables and gives the probability of the variable represented by the node. For example, if the parents are m pixel values then the probability function could be represented by a table of entries, in which each entry is a possible combination or range of combinations of pixel values for the image, and the probability of that combination. If the combination has a probability within a certain range it may be used as an indication of duress.

In step 412, if it is determined that an attack is occurring or has occurred, there an output such as an alert is sent to an interested party via email and/or an alarm may be set off in the area where the attack is occurring. If it is determined that an attack is not occurring or has not occurred, a decision can be made to stop or to continue monitoring.

In step 414, a decision is made as to whether to continue monitoring or to stop. If it is determined to continue monitoring, then method 400 is repeated for each set of data until the camera and/or the processor are turned off.

In some embodiments, each of the steps of the method 400 is a distinct step. In other embodiments, although depicted as distinct steps in FIG. 4, the steps may not be distinct steps. In other embodiments, the method 400 may not have all of the above steps and/or may have other steps in addition to or instead of those listed above. The steps of the method 400 may be performed in another order. Subsets of the steps listed above as part of the method 400 may be used to form their own method.

C. Shape and Pattern-Recognition Based Algorithms

Figure 5:
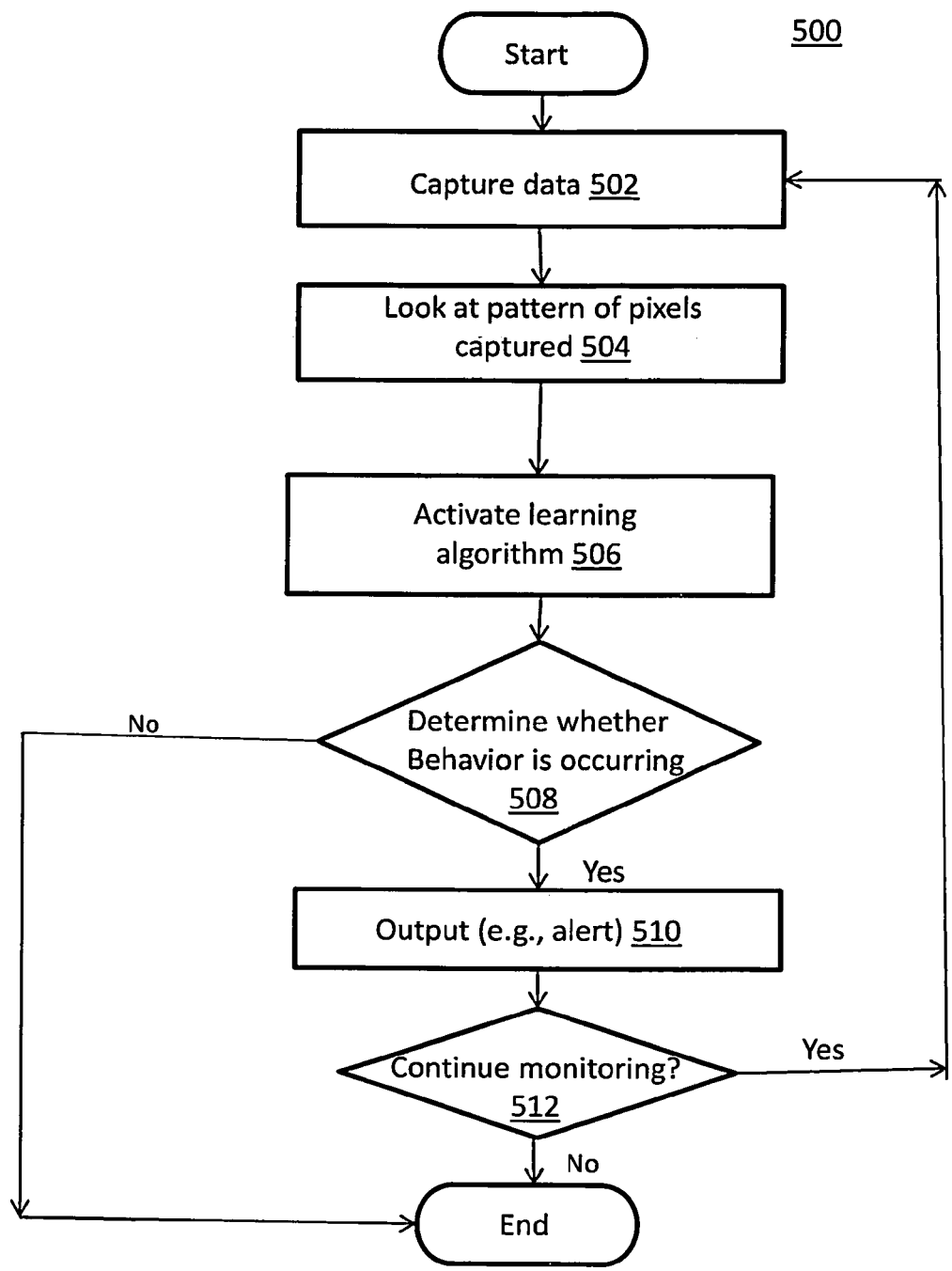
FIG. 5 shows a flowchart of an embodiment of a method of detecting attacks, based on shape and pattern-recognition based algorithms.

FIG. 5 is a flowchart of an embodiment of a method 500 of a shape and pattern-recognition based algorithm. Method 500 is another approach or type of algorithm that can be used that applies pure pattern recognition.

In step 502, data can be captured using one or more sensors. The sensor can be any sensor discussed herein including any type of camera, a speaker, and/or a motion detector.

In step 504, the pattern of pixels is captured. The pattern can be any pattern, which may be generated by a single person or groups of people.

In step 506, a learning algorithm may be activated. A learning algorithm may be trained to recognize patterns that are associated with groups of people, associated with a chemical, biological, and/or radiological attack (e.g., the learning algorithm may be trained to recognize a pattern associated with people lying on the floor or sitting or squatting that correspond to crisis events). Patterns associated with people in known states may be used as training examples and/or otherwise pre-programmed for shape detection. In an embodiment, the pattern recognition may be performed without benefit of foreground analysis, analysis of person size/aspect ratio, or feature points analysis. Pattern recognition may identify patterns of pixels of the image captured, patterns formed by profile shape descriptors, patterns of color, patterns of edge pixels, patterns of gradient histograms, patterns of signatures, patterns of textures, patterns of outer contours, patterns of Curvature Scale Space (see also description of FIG. 3B for more information on CSS), patterns of Moment Invariants, patterns of Fourier Descriptors (Fourier coefficients that are characteristic of a type of motion or shape), and/or patterns of Hausdorff distances. The Hausdorff distance or the Hausdorff metric measures how far two subsets (e.g., the current pattern of pixels or other visual cues and a pattern of pixels or other visual cues associated with duress) of a metric space are from each other, and if the distance is short enough it may be an indication of duress. It turns the set of non-empty, compact subsets of a metric space into a metric space in its own right. Informally, two sets are close in the Hausdorff distance if every point of either set is close to some point of the other set. For example, Hausdorff distance is the longest distance that can be traveled from a point in one of the two sets to the other of the two sets.

The pattern of signatures patterns formed by multiple signatures. For example, patterns of signatures may involve joining multiple simpler signatures into a pattern. For example, a human body can be broken into head, torso, and legs. Each of the head, torso, and legs may be signatures that characterize the head, torso, and legs, respectively, which form three simpler patterns of signatures that may be combined into a more complex pattern of signatures that represents a person.

Any of these patterns in pattern recognition can be derived via machine learning methods/hardware devices, such as neural or Bayesian network, HMM or some combination of these techniques and/or hardware, as previously discussed herein.

Regarding the histograms, gradients are computed for each pixel in the image (for example, using a Sobel mask), and pixels with a gradient magnitude above a certain threshold are retained. A gradient histogram is a histogram of the pixels according to brightness. Pixels can usually have one of 256 brightnesses, each bin of the histogram represents the number of pixels having a given brightness or a given range of birghtnesses. A histogram of gradient orientations can be computed for these pixels. For example, the pixel may each be placed in one of 8 bins, thereby quantizing 0-360 degree range.

A Soble mask is based on an accurate approximation to calculate the derivative of a two-dimensional image. The two dimensional Sobel operator performs a 2-D spatial gradient measurement on an image. Typically it is used to find the approximate absolute gradient magnitude at each point in an input grayscale image. The Sobel edge detector may use a pair of 3×3 convolution masks (or larger masks based on other estimations of the first derivative), one mask estimates the gradient in the x-direction (columns) and the other estimates the gradient in the y-direction (rows). The convolution mask may be much smaller than the actual image. As a result, the mask is slid over the image, manipulating a square of pixels at a time. An embodiment of the actual Sobel masks are shown below.

| −1 | 0 | +1 |
|---|---|---|
| −2 | 0 | +2 |
| −1 | 0 | +1 |

Gx

| +1 | +2 | +1 |
|---|---|---|
| 0 | 0 | 0 |
| −1 | −2 | −1 |

Gy

The values Gx and Gy may be used as the components of a vector giving the direction of the curve (which as mentioned above may be separated into 8 bins representing 8 directions that the vector may point). The magnitude of the gradient is then calculated using the formula:

$$|G| = \sqrt{Gx^2 + Gy^2}$$

In an alternative embodiment, the magnitude of the vector may be calculated using the approximation, $|G| = |Gx| + |Gy|$ The first derivative will be large in the direction perpendicular to the line forming the edge, and the Sobel mask places a pixel value at the edge and assigns a direction for the curve representing the edge that is representative of the sharpness of the edge (sharper edges result in higher pixel values) and in other areas that are not at an edge, the pixel values will be low. The Sobel edge detector is applied giving a mask of the image of edges. Where there are edges/Sobel mask, the sharper edges result in high values and where there is no edge, the pixel values tend to be low.

Alternatively, the direction of the curve may be formed by adjacent edge pixels, without relying on the direction defined G vector. Similarly, a Laplacian mask, which represent the second derivative and have a zero value or relatively low value at an edge may be used of identify the edge of an object of interest in an image (the contour of the edges lines in the image for a pattern that may be analyzed to determine whether object of interest is under duress).

In step 508, a determination is made based on the pattern as to whether the behavior or activity detected is associated with a chemical, biological, and/or radiological attack (indicating that an attack is in progress or just occurred).

In step 510, if it is determined that an attack is occurring or has occurred, an output is activated (e.g., alert is sent) 510. Any type of output that is discussed herein can occur, including an alert sent to an interested party via email and/or an alarm may go off in the area where the attack is occurring. If it is determined that an attack is not occurring, a decision can be made to stop or to continue monitoring.

In step 512, a decision is made as to whether to continue monitoring or to stop. If it is determined to continue monitoring, the method 500 is repeated for each set of data until the camera and/or the processor are turned off.

In some embodiments, each of the steps of the method 500 is a distinct step. In other embodiments, although depicted as distinct steps in FIG. 5, the steps may not be distinct steps. In other embodiments, the method 500 may not have all of the above steps and/or may have other steps in addition to or instead of those listed above. The steps of the method 500 may be performed in another order. Subsets of the steps listed above as part of the method 500 may be used to form their own method.

Figure 6:
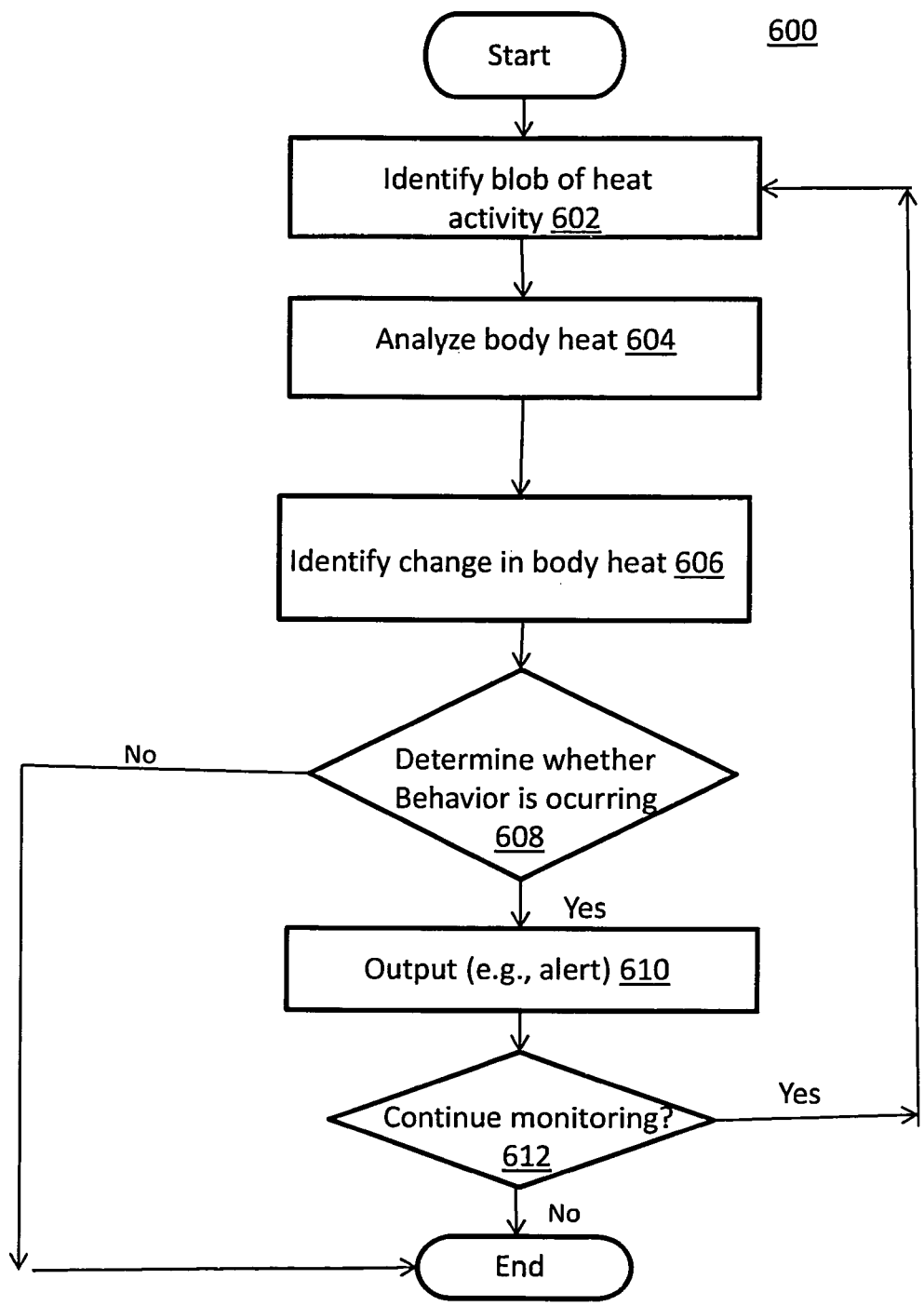
FIG. 6 is a flowchart of an embodiment of a method of detecting attacks, based on thermal analysis.

FIG. 6 is a flowchart of an embodiment of a method 600 of a shape and pattern-recognition based algorithm using data from a thermal sensor. For thermal cameras, additional special algorithms can be used. Thermal cameras may output a black and white/gray scale video with about 30 frames per second or less.

Data is captured using one or more thermal cameras in step 602. The thermal cameras can be short-range or long-range. Thermal cameras may output a black and white/gray scale video with about 30 frames per second or less.

In step 604, the heat is analyzed for one or more blobs of heat activity or the location of people, based on the clusters of heat points. The heat analysis may include a generalized temperature and/or a regional temperature (e.g., an analysis of a part of the blob or body).

In step 606, a change in body heat is identified. The change may be a change of temperature above normal body temperature or a change in temperature below body temperature. The change may be identified in the whole cluster of points identified as the body or as a part of the body.

In step 608, a determination is made whether a behavior associated with a chemical, biological, and/or radiological attack is occurring. For instance, the determination may be made by one of the following examples of methods of determining whether a behavior is associated with an attach:

1: The visual detection and tracking algorithms mentioned in methods 300-500 may also applied to thermal images. However, certain modifications may be appropriate. For example, the characteristic shape of a human in a visual image may be somewhat different than the characteristic shape of human in a thermal image, and when applying visual techniques to thermal images, it may be desirable to account for the differences in the visual appearance and the thermal image. Also, since the thermal images are grey scale/black and white rather than color, it may be desirable for the visual algorithms to treat the thermal images as images with no color information.

2: In thermal analysis of a thermal image, segments/blobs of high heat intensity may be identified and a determination may be made as to the likelihood of the blobs being people (usually blobs of high intensity are people, but some blobs may have a dimension or shape that indicate that the blob is unlikely to be a person). Then body heats may be analyzed to determine whether a signature of duress is present. For example, if a person's body heat is too high, it may be an indication that the person is under duress. Additionally, the configuration of the body heat or change in temperature, may be indicative of the position of the person and or other forms of duress.

3: Pattern recognition algorithms may be applied to determine patterns of body heat that correspond to the face, hands, and/or other part of the body. Similarly heat patterns that correspond to a mob or a large group of people that is in duress may be searched for. Knowing the body parts and heat patterns, temperatures may be measured. Some examples of information that may be derived from thermal images are: A: body temperature B: Temperature change C: Fever or sick conditions may be indicated by body temperature changes in thermal images, which may be indicative of a radiological, chemical, and/or biological attack.

In step 610, if it is determined from the above algorithm(s) that an attack is occurring, an output is initiated (e.g., alert may be sent). Any type of output that is discussed herein can be initiated, including an alert sent to an interested party via email and/or an alarm may be set off in the area where the attack is occurring. If it is determined that an attack is not occurring, a decision can be made to stop or to continue monitoring.

In step 612, a decision is made as to whether to continue monitoring or to stop. If it is determined to continue monitoring, the method 600 is repeated for each set of data until the camera and/or the processor are turned off.

In some embodiments, each of the steps of the method 600 is a distinct step. In other embodiments, although depicted as distinct steps in FIG. 6, the steps may not be distinct steps. In other embodiments, the method 600 may not have all of the above steps and/or may have other steps in addition to or instead of those listed above. The steps of the method 600 may be performed in another order. Subsets of the steps listed above as part of the method 600 may be used to form their own method.

Figure 7:
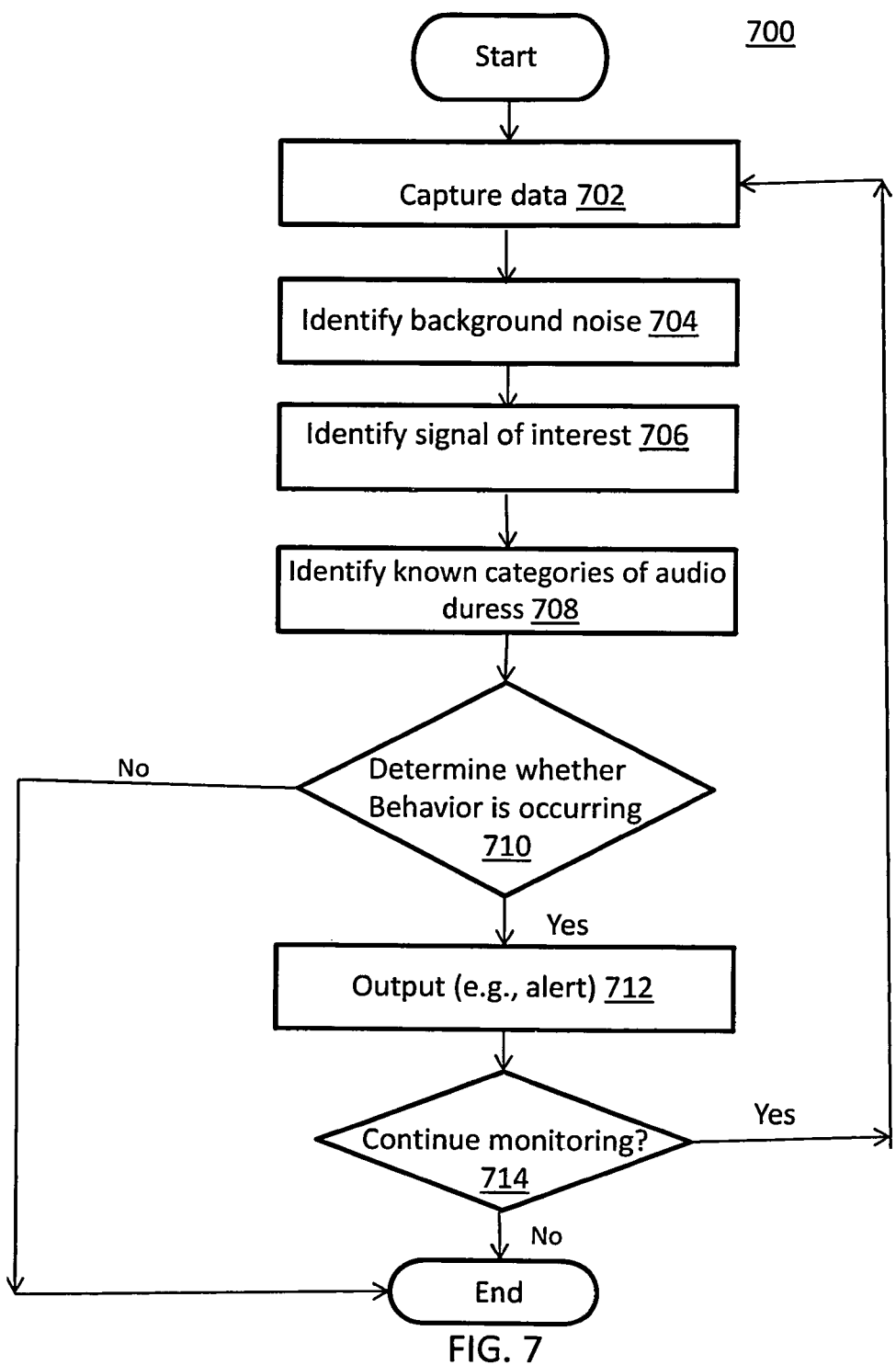
FIG. 7 shows a flowchart of an embodiment of a method of detecting attacks, based on audio analysis.

FIG. 7 is a flowchart of an embodiment of a method 700 of a shape and pattern-recognition based algorithm using data from a microphone.

With reference to FIG. 7, in step 702, data is captured as acoustic signals. Acoustic signals can be broadly classified into two categories, the signal-of-interest (e.g., duress) and noise (e.g., everything else). Microphones may be incorporated into cameras or installed separately. The microphones may capture the acoustic signals and thereby may be processed to detect any duress and/or falling events.

Background noise may identified in step 704. Background noise may be different for different areas and known background noises may be identified by the system. For example, if an alarm that is not related to an attack goes off for a particular reason and/or at a certain time, the alarm can be identified as a background noise (e.g., an alarm announcing lunchtime or a school's recess period). In some embodiments, normal background noises may be public transportation noises, which may include buzzes, ringing, etc.

In step 706, the signal of interest is identified. The signal of interest can be any signal which is not a known background noise.

In step 708, known categories of audio distress that can be associated with a chemical, biological and/or radiological attack may be identified. The two categories, the signal-of-interest (e.g., duress) and noise (e.g., everything else), can further be sub-divided into sub-categories. For example, the duress signal can be categorized as a signal chosen from: an acoustic signal due to subject's utterance of distress sounds (e.g., crying, shouting) and acoustic signal due to the subject falling or knocking things over. The noise signal can be sub-categorized as, for example, the subject talking, or moving around in the scene, dropping objects, and background noise. Talking may be subcategorized as stress related and as non-stress related, because people tend use certain words (e.g., the word "help") more often when under duress. In step 710, a determination may be made as to whether the behavior associated with a chemical, biological and/or radiological attack is occurring. Supervised learning may be applied to acoustic models to train the detector to recognize different categories. For learning, features may be extracted from the acoustic signals. Some features of interest that can be extracted include but are not limited to: Perceptual Linear Predictive coefficients, wavelet transform coefficients, Auto-regressive model, and Fourier Transform. Each of these form a shape descriptor of the signal that can be used for matching by comparing them to identify objects (e.g. people) and/or the states of the objects (e.g., whether the person is under duress).

Perceptual Linear Predictive coefficients involve linear prediction. Linear Prediction is the representation of future signal samples as a linear combination of the past signal samples. The coefficients of this representation are called the Linear Predictive coefficients.

Wavelet transform coefficients, Auto-regressive model, and Fourier Transform each forms a descriptor of the signal and then can be compared to determine whether the detected coefficients match within a given tolerance. For example, the coefficients of Fourier Transform of two signals can be compared for matching. A wavelet transform coefficient is basically a series of orthogonal square integrable functions in an embodiment are used to represent a function.

Using linear predictive analysis, a specific image sample at the current time can be approximated as a linear combination of past image samples. Through minimizing the sum of squared differences (over a finite interval) between the actual image samples and linear predicted values a unique set of parameters or predictor coefficients can be determined.

Perceptual linear prediction, similar to LPC analysis, is based on the short-term image spectrum. In contrast to pure linear predictive analysis of images, perceptual linear prediction (PLP) modifies the short-term of images by several hueristic based transformations.

An autoregressive (AR) model is a type of random process that may be used to model and predict the behavior of a group of people. AR(p) represents an autoregressive model of order p. The AR(p) model is defined as:

$$X_t = c + \sum_{i=1}^{p} \varphi_i X_{t-i} + \varepsilon_t$$

where $\phi_1, \ldots, \phi_p$ are the parameters of the model, c is a constant and $\varepsilon_t$ is white noise. The constant term is omitted by many authors for simplicity. An autoregressive model can thus be viewed as the output of an all-pole infinite impulse response filter whose input is white noise. Some constraints are necessary on the values of the parameters of this model in order that the model remains wide-sense stationary. For example, processes in the AR(1) model with $|\phi_1| \geq 1$ are not stationary. More generally, for an AR(p) model to be wide-sense stationary, the roots of the polynomial. $z^p - \sum_{i=1}^{p} \phi_i z^{p-i}$ must lie within the unit circle, i.e., each root $z_i$ must satisfy $|z_i| < 1$. Perceptual Linear Predictive coefficients, wavelet transform coefficients, Auto-regressive model, and Fourier Transform can be used to extract features by searching for matching values of numerical parameters (within a given tolerance), such as the waveform coefficients. (See step 710 of FIG. 7 above for more information on these coefficients). For feature extraction, a windowed segment of the signal can be used, such as a Hamming window, with some overlap, which may be used to construct a density function. The Hamming window for feature extraction may be written as:

$$w(n) = 0.54 - 0.46\cos\left(\frac{2\pi n}{N-1}\right)$$

Other window functions may be used for feature extraction, including any function that is zero-valued outside of a chosen interval. For instance, a function that is constant inside the interval may be multiplied by a representation of an image of the area being monitored. The product is zero-valued outside the interval, leaving the part where the window function overlaps the function being viewed, the product is the "view through the window". Alternatively, the window functions is not identically zero outside an interval, as long as the product of the window multiplied by its argument is square integrable, that is, that the function goes sufficiently rapidly toward zero.

To learn the underlying density function, both parametric and non-parametric techniques can be employed and a Bayesian classifier can be used to classify the signal. A Bayesian classifier is a Bayesian network that has been trained to classify different types of behaviors. Machine learning methods, such as a Support Vector Machine or a Neural Network, may classify features of the images based on the categories learned during the supervised training. A Support Vector Machine (SVM) is a standard machine learning algorithm for binary pattern classification. During training stage, a model is built (separating hyperplane) by classifying training samples into one of the two categories. During classification, a test sample is classified using the same model. The uniqueness of SVM is that it tries to maximize the gap separating the samples from the two categories.

In step 712, if it is determined that an attack is occurring, an output (e.g., alert) is initiated. Any type of output that is discussed herein may be initiated, including an alert sent to an interested party via email and/or an alarm may go off in the area where the attack is occurring. If it is determined that an attack is not occurring, a decision can be made to stop or to continue monitoring. In some embodiments, the method 700 is repeated for each set of data until the camera and/or the processor are turned off.

In some embodiments, each of the steps of the method 700 is a distinct step. In other embodiments, although depicted as distinct steps in FIG. 7, the steps may not be distinct steps. In other embodiments, the method 700 may not have all of the above steps and/or may have other steps in addition to or instead of those listed above. The steps of the method 700 may be performed in another order. Subsets of the steps listed above as part of the method 700 may be used to form their own method.

Abnormal Behaviors Related to Chemical, Biological, and/or Radiological Attacks

Behaviors that are indicative of chemical, biological and/or radiological attacks can be any behavior that would be considered abnormal in a particular place or situation. Thus, the behavior may differ depending on the place (e.g., a gym or a dance club). Chemical, biological, and/or radiological agents may cause people to lose partial or full control of their faculties and exhibit abnormal behavior patterns typical of a person in duress. The following are some of the typical duress signals exhibited by people exposed to chemical, biological, and/or radiological agents. Any one or more of these conditions may be exhibited, including but not limited to; falling down; falling into an unconscious state (thereby exhibiting no action); writhing; repeated falling; walking slowly or unable to walk; changing the direction of walking to random directions at random intervals, staggering, bending and doubling over; coughing; walking erratically; lurching; sitting down and confused; running; standing-still and not moving; walking slower than usual; shaking and shivering; leaning on others; leaning on walls; leaning on objects; unable to support one's weight; confused and staring at the wall; staring at the ceiling; staring at an object; seizures; shaking of the body (in seizure-like patterns); shaking of the hands (in seizure-like patterns); shaking of the legs (in seizure-like patterns); shouting; crying; moaning/groaning; panic and pandemonium; an unusually high number of people in the scene; and/or combinations of visual and audio clues. People forming a circle or a partial circle around a clearing having one or two people and/or objects within.

Audio duress behaviors may include, but are not limited to any distress sounds and/or sounds of panic, including: shouting, abnormal sounds, coughing, gagging, crying, moaning/groaning, yelling for help, yelling "fire", the sound of a firearm, and the sound of an explosion.

In some embodiments, one or more of the conditions indicates an attack, and an alert is not sent unless the required number of conditions have occurred, including two, three, four, five, six, seven, eight, nine, ten, or eleven conditions, for example. In some embodiments, people who work in the area with disorders such as epilepsy, mental illness, Parkinson's disease, and any other musculoskeletal disorder are included in the learning algorithms. In some embodiments one or more people exhibiting any of these behaviors at one time can be indicative of an attack. In an embodiment, an alert is not activated until a threshold number of people, percentage of people, and/or density of people exhibit behaviors indicative of duress. The required number of people may be two people, three people, four people, five people, six people, seven people, eight people, nine people, or ten people, for example.

Any one or more of the above duress behaviors indicate a possible chemical, biological, and/or radiological attack. The chemical, biological, and/or radiological agents each have varying affects on people, and the signatures of chemical, biological, and/or radiological agents can be analyzed and classified to determine the type of attacks.

Figure 10:
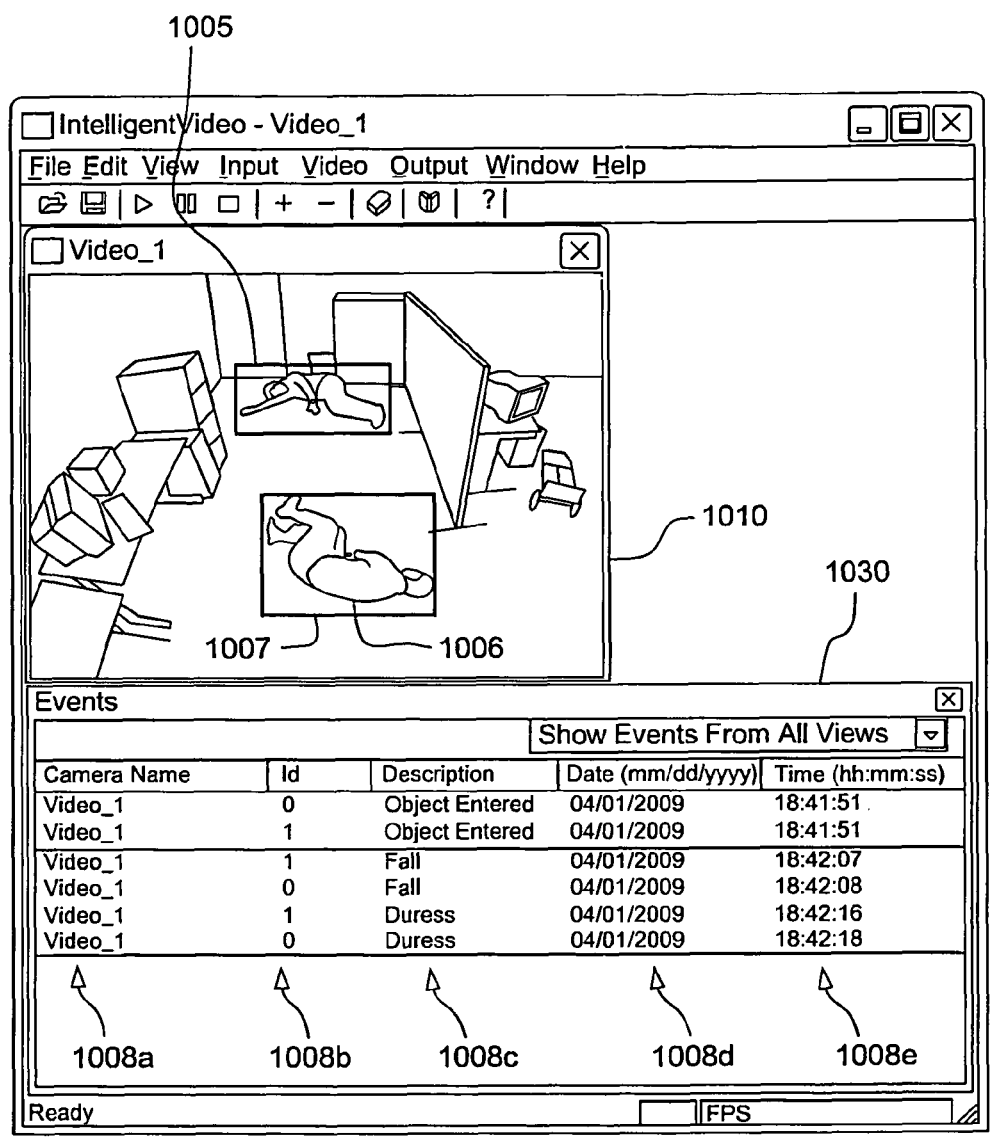
FIG. 10 shows an example of results for attack event detection.
Figure 11:
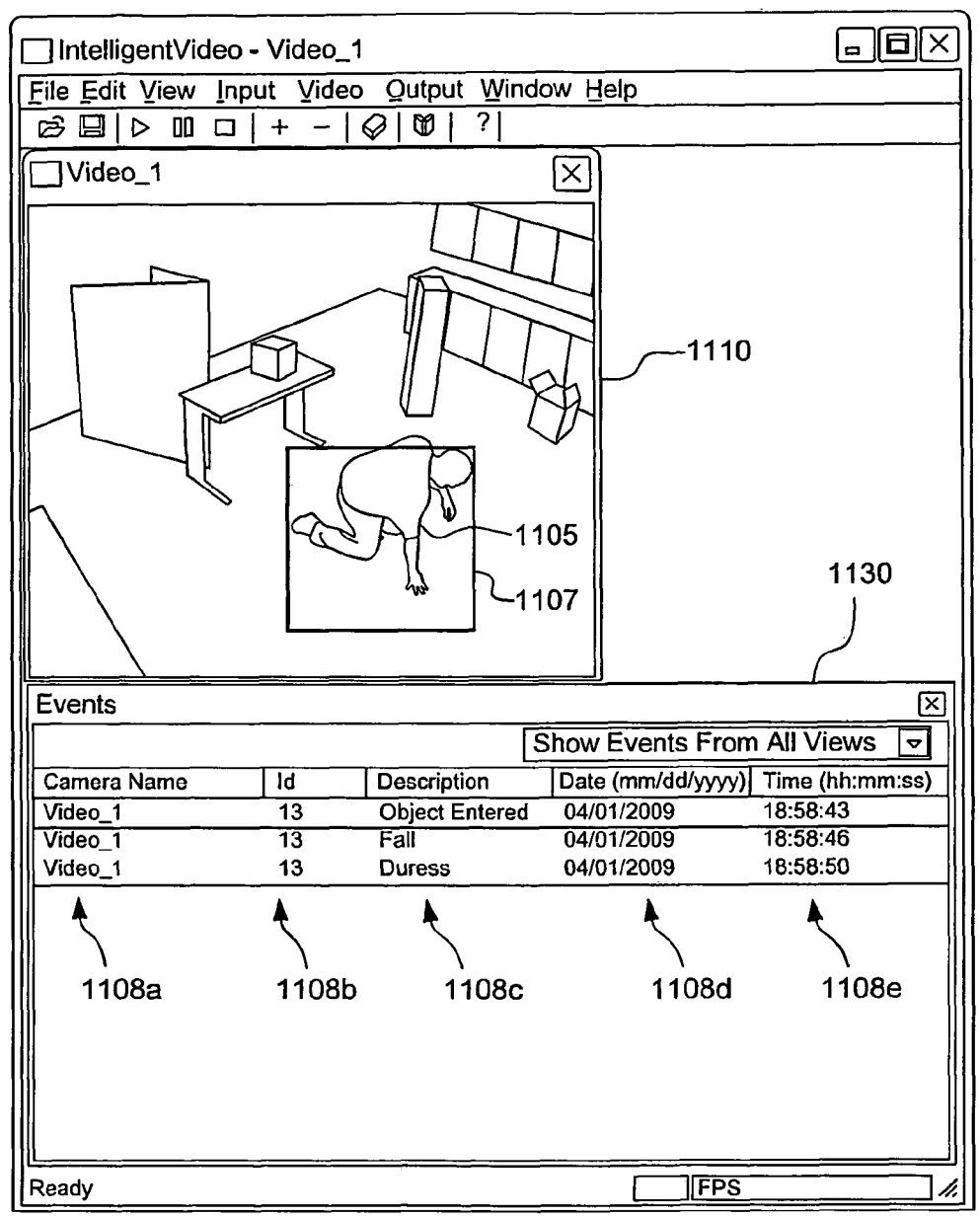
FIG. 11 shows an example of results for attack event detection.

Examples of behavioral data are included in FIGS. 10 and 11. In FIG. 10 an individual has been identified that is lying down in a position indicative of an attack. In FIG. 11 an individual has been identified that is in a position that indicates difficulty standing, which may be an indication of an attack or a crisis situation.

System Architecture and Components

Figure 8A:
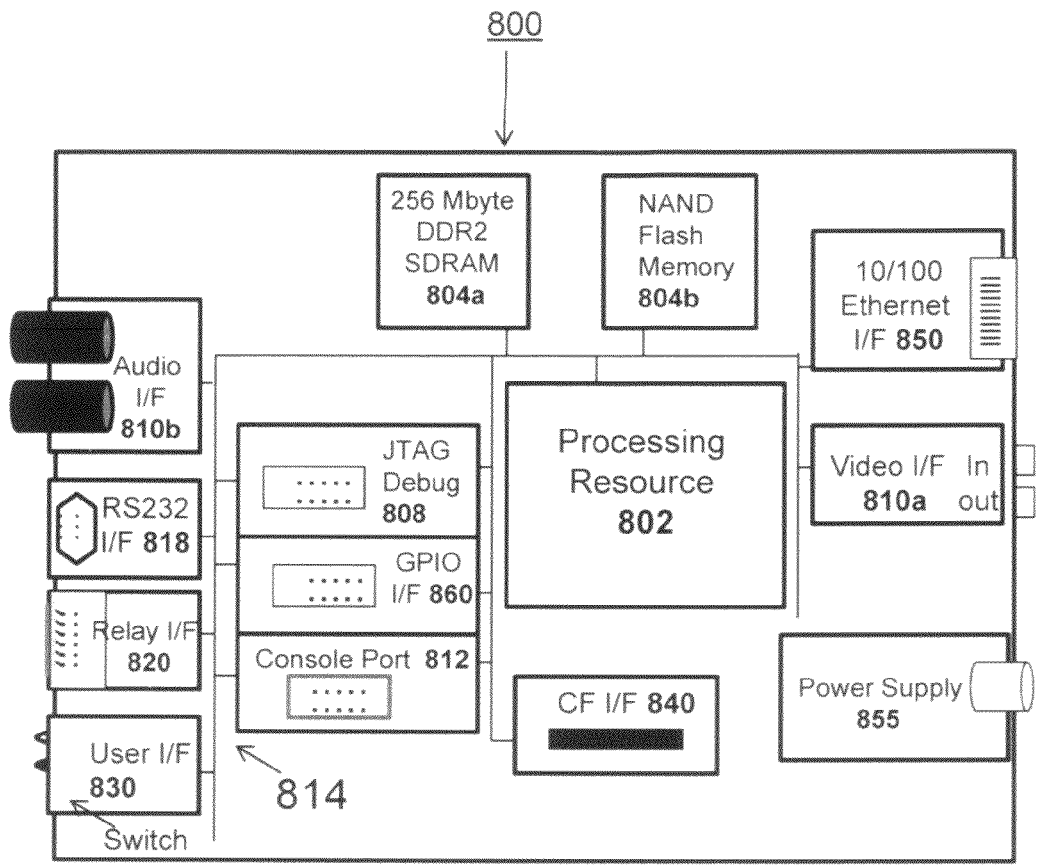
FIG. 8A shows a block diagram of an embodiment of a circuit board configuration and layout for use in the system of FIG. 1.

FIG. 8A provides an embodiment of the architecture and components of a system 800 used in the methods of detection of chemical, biological and/or radiological attacks, which may be an integrated circuit or circuit board, for example. The system 800 may include processing system 802, one or more memory systems, 804a and 804b, one or more JTAG (joint test action group) debug 808; one or more sensor interfaces 810a and 810b, one or more console ports 812; communication bus 814; one or more RS232 I/F (interfaces) 818; relays and/or relay I/F 820, one or more user interfaces 830, one or more CF flash cards (CF I/F) 840, one or more USB ports 844, an Ethernet interface 850; a power supply 855; a general purpose interface (GPIO I/F) 860; one or more serial ports. In other embodiments, the system 800 may not have all of the elements or features listed and/or may have other elements or features instead of or in addition to those listed.

Figure 8B:
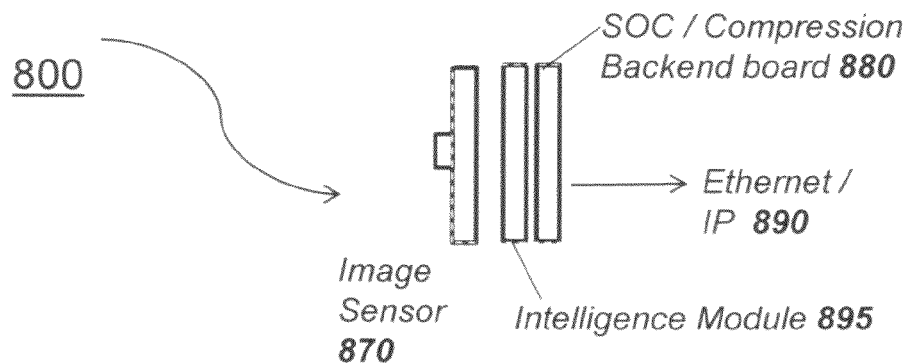
FIG. 8B shows an embodiment of a circuit board including a processor that can be installed into a camera.
Figure 9A:
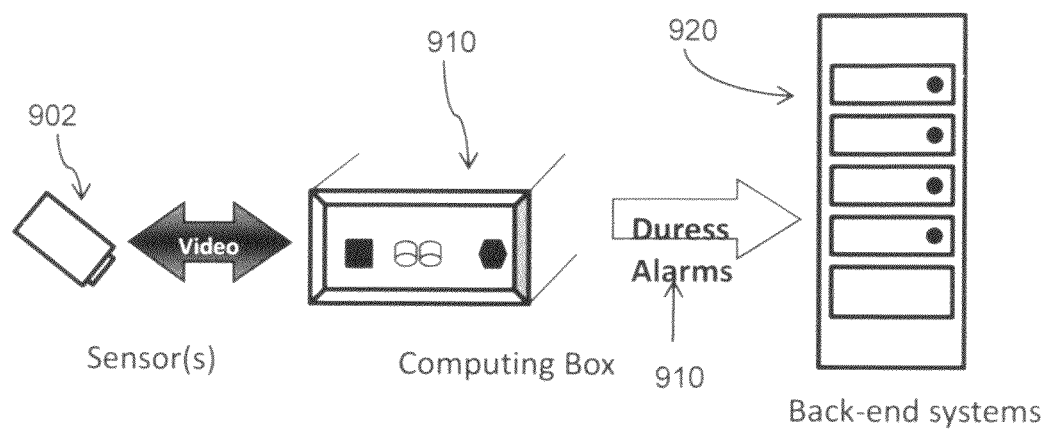
FIG. 9A shows an embodiment of a processor external to the camera.
Figure 9B:
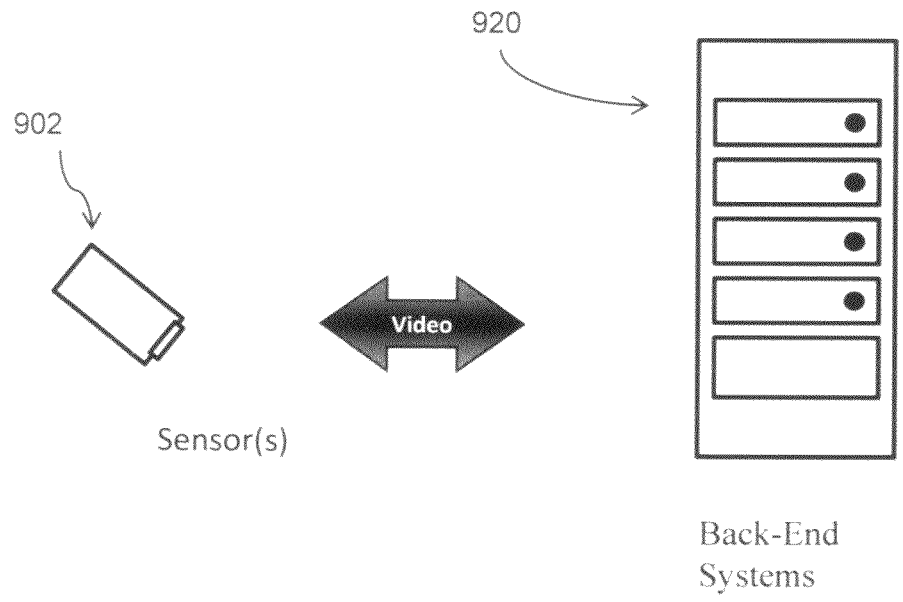
FIG. 9B shows an embodiment of a backend computing and processing module.

The system 800 may be included inside a camera (see FIG. 8B), outside the Camera/box (see FIG. 9A) or in a server backend Computing/Signal processing module (see FIG. 9B).

The processing device/Engine 802 (which is x86 based-Pentium based, DSP, and/or FPGA) may be inside of one or more of the sensors (e.g., cameras), external to of one or more of the sensors (e.g., cameras), and/or at the back-end. The Processing Device/Engine may be a CPU that analyzes the sensor data and determines duress and/or distress conditions.

Memory 804a (256 Mbyte DDR2 SDRAM) and 804b (NAND Flash Memory) can store one or more machine instructions. The machine instructions, when implemented can cause the processor system to perform a method analyzing the data, and/or determining whether the data indicates an attack has occurred based on the analyzing. The machine instructions can send a signal (if an attack has occurred) to the alarm system that causes an alert to be sent. The memory is discussed in more detail with reference to FIGS. 2A and 2B herein. The one or more JTAG (joint test action group) debugs 808 is a common name for the IEEE 1149.1 Standard Test Access Port and Boundary-Scan Architecture. In an embodiment, the JTAG Debugger 808 may be used for this testing system 800. JTAG debugger 808 can be used for system debugging/diagnostics and to update device firmware.

The sensor interface (I/F) 810a and 810b (a video I/F and an audio I/F) interfaces with sensors. The sensors may be one or more of color, infrared, thermal cameras, and/or microphones or any of the sensors discussed herein. The sensor can be just one color camera or multiple sensors communicatively connected to one another that work in tandem at a given location. The sensor interface may include an audio in and out and/or a video in and out, and an Analog or IP Input/Output including Committee/Phase Alternating Line and an analog out (NTSC/PAL).

The one or more console ports 812 may be used to connect to a computer for controlling and receiving output from system 800.

The communication bus 814 communicatively connects processing system 802, one or more memory systems, 804a and 804b, one or more JTAG (joint test action group) debug 808; one or more sensor interfaces 810a and 810b, one or more console ports 812, one or more RS232 I/F (interfaces) 818; relays and/or relay I/F 820, one or more user interfaces 830, one or more CF flash cards (CF I/F) 840, one or more USB ports 844, Ethernet interface 850, a general purpose interface (GPIO I/F) 860, and/or one or more serial ports so as to allow them to communicate with one another.

The one or more RS232 I/F (interfaces) 818 are serial data interfaces that can be found in modems and personal computers, for example. The RS232 can be used to communicate with the sensor serially as a common feature.

The relays (input and output) and/or relay I/F 820 are contact closures. The relays can be used to monitor and control low voltage devices such as contact closures, outdoor lights, appliance relays, and alarm systems, which may be used to send an alert of an abnormal behavior. For example, when relays are closed, current flows, creating a signal. A bulb or speaker can be connected to the relays, and closing the relays may turn on the bulb or speaker. Relay I/F 820 may be an RS232 relay, which a serial port, which may be used to exchange information serially via byte by byte processes to the connected device, such as between a sensor in the field and monitoring station that receives the images and/or other information sensed.

The user interface (I/F) 830 with an on/off switch can allow the user to decide when the system should be operating and when it can be turned off.

The CF Flash card (CF I/F) 840 can be used to store video/audio/sensor data.

The USB ports (Universal Serial Bus) 844 to connect computer peripherals such as mice, keyboards, digital cameras, printers, personal media players, flash drives, and external hard drives; Solid state drive or Hard-drive; a real-time Clock; and/or Wireless connectivity (Bluetooth/Wifi/GSM). The storage memory slot can be used for a USB flash memory stick to download/upload data.

The an Ethernet interface (I/F) 850 can allow connection to a network interface (e.g., connected to the Internet), for monitoring one location from another location connected to the same network. The network interface can be used to send alerts and alarms. The sensors may be connected to a network interface (e.g., and connected to the Internet) via the Ethernet I/F 850, which may provide a window to the outside world, via which alerts and alarms may be sent.

The power supply 855 can be used to power the processor, sensors and other systems that need a power supply. The general purpose interface (GPIO I/F) 860 can be used to interface with external devices and peripherals. GPIO I/F 860 can act as input, to read digital signals from other parts of a circuit, or output, to control or signal to other devices. GPIO I/F 860 may be configurable to produce CPU interrupts and be able to use Direct Memory Access to move large quantities of data efficiently into or out of a device, such as images from the sensors to the computer or CPU. In some GPIO I/F 860 include a group of pins that can be switched as a group to either input or output. In other embodiments, each pin can be setup flexibly to accept or source different logic voltages, with configurable drive strengths. The input and output voltages of GPIO I/F may be limited to the supply voltage of system 800 to prevent damage. External systems and servers may be included for communications, monitoring, and event/data management. There may be external systems that are on the network and listen to sensor farms or optical sensors. The sensor systems can collect events, video/audio data and manage events, monitoring the system and sensor health and also provide configuration/setup and management functions. A Local area network (LAN) can be connected to the local Ethernet RJ45 port.

FIG. 8B provides an example in which the processing module (processor) may be located inside the camera and the camera therefore becomes an intelligent camera. The system 800 may include an image sensor 870, a SOC/Compression board 880; an Ethernet IP 890; and an intelligence module 895. In other embodiments the system may not have all of the elements or features listed and/or may have other elements or features instead of or in addition to those listed.

The Image sensor 870 can include any type of sensors discussed herein. The sensor(s) 870 may detect abnormal behavioral data associated with a biological, chemical and/or radiological attack. The sensor(s) 870 may be near-range and/or long-range sensors. The sensor(s) 870 may have visual, audio, and/or thermal sensing abilities, which may determine whether there are any such attacks. In an embodiment, the sensor(s) 870 can be used to detect behavior patterns of people. The sensors 870 can be optical (visual), audio, infrared, thermal, chemical/biological/radiological and/or a combination thereof.

The SOC/Compression board 880 may be used to compress the video from the camera or input video signal. The compressed video output is sent out via Ethernet port or stored in the local memory.

The Ethernet IP 890 is an open communications protocol designed for use in process control and other applications. EtherNet/IP is an application layer protocol and it considers all the devices on the network as a series of "objects". EtherNet/IP is built on the widely used CIP which makes seamless access to objects from controlNet and DeviceNet networks. Ethernet IP 890 may be used for sending messages, such as alerts, images, and/or sounds from a seen to other locations and/or devices for monitoring.

The intelligence module 895 provides the memory and processing capability that can be used for analyzing the behavioral data from the sensor(s) 870 and to identify behaviors associated with a biological, chemical and/or radiological attack.

The hardware device and sensor-processor 800 may be located inside the camera, which eliminates the need for any external devices. Placing the processor inside the camera may also allow the device to be simpler overall. Some camera manufacturers already include a processor in their cameras, and consequently, depending on the processing power of the camera, an off-the-shelf camera may be programmed to form a sensor for detecting duress. In an example, a board including a processor may be installed into a camera. In an embodiment the processor and/or board may include a Bayesian network and/or neural network. FIG. 8B is an example of a board 800 that plugs into the camera making the camera an intelligent camera that (after being properly programmed and/or trained) is capable of processing duress detection.

FIGS. 9A and 9B provide embodiments in which the processor is outside the camera. In FIG. 9A the processor is external to the camera, a small computing box (which may include a DSP or FPGA or Pentium based CPU) may be communicatively connected to the camera. In FIG. 9B the processing is performed in the backend, the computing device that performs the analysis of the information collected and/or may control the sensors may be the back-end server, and all or part of the processing may be performed at the backend.

FIG. 9A provides an example in which the processing module may be in a small computing box 910 communicatively connected to the camera 902. The system may include one or more of, at least one sensor 902, at least one computing box 910, at least one duress alarm 915 and at least one back end system 920, all of which are communicatively connected. In this processing module, the sensor (e.g., camera 902) is associated with a computing device 910 that are both remote from the back end system 920, and the computing device 910 analyzes the situation to determine whether to put out an alert (e.g., a duress alarm 115). In other embodiments the system may not have all of the elements or features listed and/or may have other elements or features instead of or in addition to those listed.

The sensors 902 can be any sensors discussed herein, including, but not limited to cameras, motion detectors and thermal sensors and microphones.

The computing box 910 may be used as discussed herein as a processor or computer for doing part of the processing, for example, obtaining the data from the sensor(s) and/or analyzing the data obtained.

The duress alarms 915 may be any type of alarm, including audio, a computer operated message, and/or visible (e.g., a blinking light).

The back end system 920 may be used to perform the rest of the processing, for example, analyze the data and make the decision whether to send out an output.

FIG. 9B provides an example in which the computing device that performs the analysis of the information collected and/or may control the sensors may be the back-end server 920, and all or part of the processing may be performed at the backend. The system may include one or more of, at least one sensor 910, and one or more back end systems 920, communicatively connected. In this system, the back end systems 920 distribute the information (e.g., the images and/or the alert) to those monitoring the output. In other embodiments the system may not have all of the elements or features listed and/or may have other elements or features instead of or in addition to those listed.

The sensors 902 can be any sensors discussed herein, including, but not limited to cameras, motion detectors and thermal sensors and microphones.

The back end systems 920 may perform as a processor or computer for doing all of the processing, for example, obtaining the data from the sensor(s) and/or analyzing the data obtained and/or deciding if an output should be performed. In some embodiments, the back end systems 920 also control the sensors and/or output systems.

An Example of an Output for an Attack

In FIG. 10 is example of an individual that has been identified that is lying down in a position indicative of an attack. Data was captured by video and is shown as a video image 1010. The figure shows two people 1005 and 1006 that have fallen. The people were analyzed using bounding boxes 1007. The bounding box is analyzed to decide if it indicates duress. For example, a width to height ratio for the bounding box of 2/7 indicates a non-duress behavior, while a ratio of 7/2 indicates duress (unless, for example, the image is of someone lying in bed or doing yoga). However, a ratio of even 1/1 has a reasonable probability of duress. In an embodiment, the ratio may be the same as a person's height/width aspect ratio. People that are tall will have a higher height to width ratio, because the height is greater than width. When they fall down, the height decreases and this aspect ratio reduces significantly. The data is provided in the bottom of the figure in a tabular form with the first column 1008a showing which video camera is providing the data (e.g., video_1). The second column 1008b provides the Id, the third column 1008c provides the description (e.g., object entered, fall, duress, etc.), the fourth column 1008d provides the date and the fifth column 1008e provides the time. Also included is a window 1030 for selecting which data to view. The window is set to view all data, but there are other options (e.g., to view a particular room or a particular time, to view a particular camera over a period of time, to view more than one camera, etc.)

In FIG. 11 an individual has been identified that is in a position that indicates difficulty standing, which may be an indication of an attack or a crisis situation. In both figures, data was captured by video. One or more figures was analyzed over a period of time (from 18:41:51 to 18:42:18 for FIG. 10 and from 18:58:43 to 18:58:50 in FIG. 11). A behavior associated with an attack was identified. The figures show the data that was provided to the interested party. Data was captured by video and is shown as a video image 1110. The figure shows one person 1105 that has fallen to his knee. The person was analyzed using a bounding box 1107. The bounding box is analyzed to decide if it indicates duress. For example, a width to height ratio for the bounding box of 2/7 indicates a non-duress behavior, while a ratio of 7/2 indicates duress (unless, for example, the image is of someone lying in bed or doing yoga). However, a ratio of even 1/1 has a reasonable probability of duress. The data is provided in the bottom of the figure in a tabular form with the first column 1108a showing which video camera is providing the data (e.g., video_1). The second column 1108b provides the Id, the third column 1108c provides the description (e.g., object entered, fall, duress, etc.), the fourth column 1108d provides the date and the fifth column 1108e provides the time. Also included is a window 1130 for selecting which data to view. The window is set to view all data, but there are other options (e.g., to view a particular room or a particular time, to view a particular camera over a period of time, to view more than one camera, etc.).

Methods of Making the System

Figure 12:
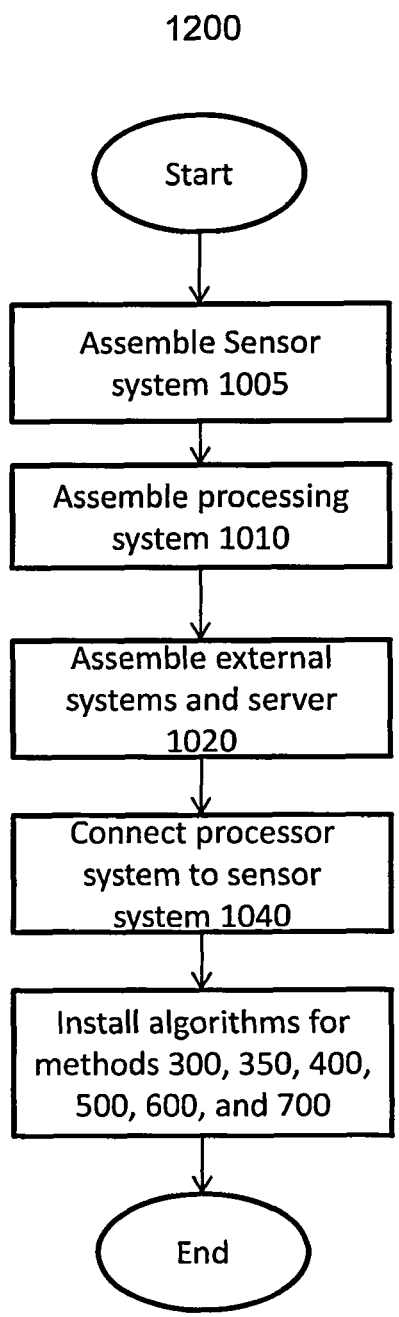
FIG. 12 shows a flowchart of an embodiment of assembling the system of FIG. 1.

FIG. 12 provides a flow diagram of a method 1200 of making the system discussed herein. The system can be assembled in any manner known to create a workable system for performing the methods described herein. For example, with reference to FIG. 12, in step 1205 the sensor system is assembled. The sensor system can include any one of, or combination of, the sensors described with reference to system 100 (FIG. 1). The processing system can be assembled in step 1210 and can be a part of the sensor system or can be separate thereto. The external systems and server can be assembled in step 1220 using methods known to the skilled artisan. In step 1240, the sensor system is then connected to the processing system and the external systems and server. The connecting can be using any method known to the skilled artisan including a wireless connection. The appropriate algorithms are installed in step 1250 for any of the methods discussed herein, including methods 300, 350, 400, 500, 600, and 700.

Video, Audio Data Management & Event Recording, Streaming and Sharing

The system may provide sensor data management capabilities. When the sensor data includes multiple behavioral data from multiple sensors (e.g., video, thermal, and/or audio data), data management capabilities may be provided in the system, including but not limited to: 1) Acquire—the acquire capability acquires the video/audio and/or other data from the sensors, 2) Display—the display capability displays the video/audio data, 3) Store/Record—the store/record capability records and/or stores the sensor video/audio and/or other data, 4) Search—the search capability may allow the searching and viewing of the data, 5) Stream—the stream capability may allow the streaming and sending of data out via a network (e.g., a wide area network, such as the Internet or a local area network), 6) Compress—the compress capability may allow the user to compress the data, 7) Age—the age capability may automatically erase older information (e.g., information that is older than a certain age and thereby reduce the data over time, 8) Delete—the delete capability may allow the user to delete and/or purge the old data that is not required, 9) Configure—The configure capability may configure the settings for data management and/or other settings, 10) Archive—the archive capability may output and store data on a CD or file and archive the data, 11) Email/Share—The email/share capability may allow the user to send an email or otherwise share sensor data with another person or entity, 12) Associate event—The associate event capability may automatically or manually tag an event to the sensor data, 13) Print—the print capability may allow a user to print the data, and/or 14) Annotate/Tag/mark up—The annotate/tag/markup capability may allow a user to annotate, tag, and/or markup the sensor data.

Reports, Additional Information and Type of Attack Classification

The system may provide additional reports that result from analyzing the sensor data and signal processing. The additional reports may include: 1) a people count, which may detect and/or count and number of people, 2) People Analytics—people analytics may analyze and report locations of people, the speed of travel of the people, the direction of travel of people, the wait times along traffic routes, the paths that people take, 3) Traffic patterns—traffic patterns may analyze and report traffic patterns of people, 4) Time of day analysis—time of day analysis may analyze the behavior patterns based on time of day, and/or 5) Type of attack classification—type of attach classification may use sensor information, various rules, and heuristic rules to classify the likely type of attack (e.g., chemical, biological, and/or radiological) that is ongoing. The some type so sattacks may be included into multiple categories. For example, rules can be: 1: If the person is running, then attack is a certain type A2, which may include attacks that involves explosions, gun fire, and/or physical assault. If there are multiple people and all are having the same symptoms, then the attack can be type B3, which may include a gas attack or biological attack, for example. If a person immediately falls down and is not moving, then the attack type can be C, which may include gun fire or an explosion.

The system may include a record or log and/or a report internally in a database or event log. The system may send mobile SMS, MMS, or pager messages to external people, security guards, and/or medical people. The system may send an e-mail, make a phone call, and/or send other forms of messages to alert further concerned parties about the occurrence of an attack.

Figure 13:
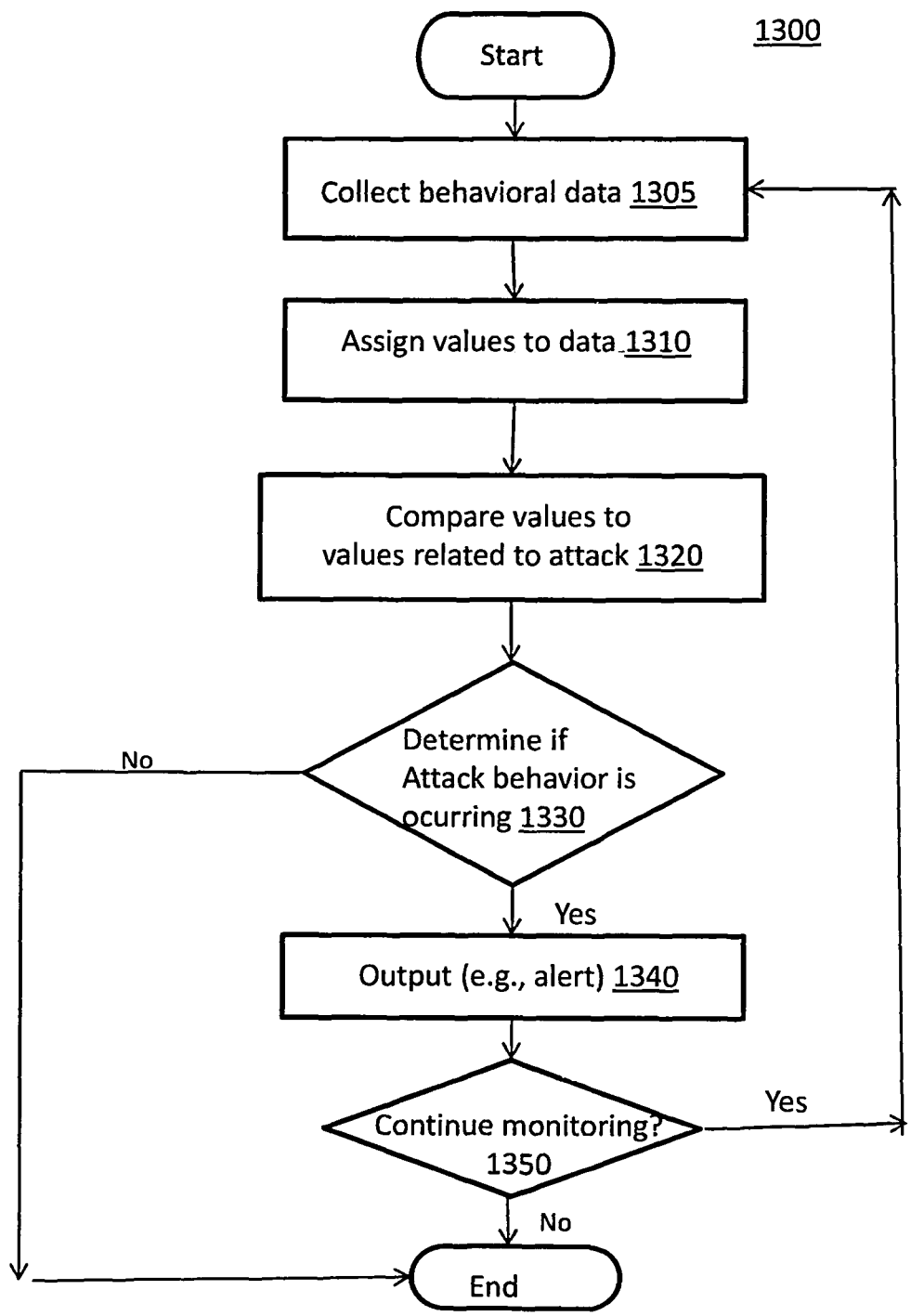
FIG. 13 shows a flowchart of an embodiment of a method of detecting attacks.

As shown in FIG. 13, the methods may involve detection of a chemical, biological, and/or radiological attack, by the following steps: collecting data related to behavior associated with one or more persons (step 1305); analyzing the data collected to determine one or more values characterizing the behavior (step 1310); comparing the one or more values characterizing the behavior to one or more values characterizing behavior of one or more persons during a chemical, biological or radiological attack (step 1320); determining whether an attack has occurred based on the comparing (step 1330); and activating an alert that an attack has occurred (step 1340), if as a result of the determining it is determined that an attack has occurred. In either case, a decision can be made to continue monitoring (step 1350). In some embodiments, the data is collected via a camera, a thermal camera, or an audio sensor. In some embodiments, the behavior is characterized as related to an attack based on the algorithms discussed herein. In some embodiments, the activating of the alert includes at least sending a message indicating that an attack has occurred to a device associated with a concerned party.

Hardware system 100 may be configured for detecting chemical, biological and/or radiological attacks, by detecting different types of distress, symptoms, behavior and/or other clues (to confirm the attack). Some signs of distress may include falling, being motionless, struggling, kneeling, and squirming, coughing, staggering, walking sideways, lost, and/or disoriented etc. There has several types of detection. The detection may be based on visual person shape, size, ratios, and/or colors etc. and/or may be based on 1 or few frames, which may be used for detecting a person falling, for example. The detection may be based on motion and/or movements, such walking, standing, and/or running and then falling or sitting or kneeling based on other behavior or events, other people behavior, multiple event analysis or clues. There may be multiple sensor analytics or recognition from visual, thermal and audio—for example. There may be external sensors such as chemical or bio agent detection sensors giving partial clues and a hybrid of different detection methods may be employed. During audio detection the sounds may be monitored shouting, yelling, asking for help, distress sounds, panic sounds etc. Some types of sensors that may be used include visual, infrared/thermal (long and near range), audio, and/or other external sensor clues/input (which can be other than chemical and/or chemical). There may be any number of sensors. The hardware/system configuration or setup may include a CPU and/or other hardware inside camera or sensor, a small CPU box outside adjacent to sensor and/or a backend PC/Server connected to the server over a network. Results of the monitoring may be presented online and/or in realtime and/or offline. There may be one or multiple processors.

Each embodiment disclosed herein may be used or otherwise combined with any of the other embodiments disclosed. Any element of any embodiment may be used in any embodiment.

Although the invention has been described with reference to specific embodiments, it will be understood by those skilled in the art that various changes may be made and equivalents may be substituted for elements thereof without departing from the true spirit and scope of the invention. In addition, modifications may be made without departing from the essential teachings of the invention.

The invention claimed is:

1. A system comprising:
a sensor system including at least one sensor that measures behavioral data associated with one or more persons, the sensor being mounted in a public location where multiple people gather;
an input system for inputting attack detection parameters;
an alarm system including at least one alarm;
a processor system including at least one processor; and
at least one memory system storing one or more machine instructions, which when implemented cause the processor system to perform a method including at least:
obtaining, by the processor system, the data from the sensor system,
analyzing, by the processor system, the data,
comparing, by the processor system, the data to data characterizing an attack,
determining, by the processor system, whether the data indicates the attack based on the comparing, wherein the determining whether the data indicates the attack based on the comparing includes at least determining whether the data indicates the attack based on whether a threshold density of people exhibit behaviors indicative of duress,
if the determining results in a determination of the attack, classifying, by the processor system, the attack into a type of attack classification based on pre-established rules, sending a signal to the alarm system that causes an alert to be sent, and providing, by the system, the type of attack classification and location information indicating a location of the attack.

2. The system of claim 1, the sensor system including at least a plurality of sensors and the system combines information from each of the sensors to determine whether an attack is in progress.

3. The system of claim 1, wherein the sensor system includes at least one thermal sensor; and
the method also including at least:
associating a cluster of points of a thermal image with a person,
determining a change in body temperature of the person from the thermal image, and
determining whether the change in body temperature of the person is indicative of the attack.

4. The system of claim 1, wherein the sensor system comprises a plurality of cameras and audio sensors, the data including a conversation, the analyzing including determining content of the conversation, and the determining including determining whether the content of the conversation indicates an attack.

5. The system of claim 1, wherein the sensor system comprises at least one camera and at least one thermal sensor.

6. The system of claim 1, the method further including at least:
capturing data;
learning a background;
separating a foreground from the background;
establishing at least one bounding box based on the foreground;

determining an aspect ratio of the at least one bounding box;
determining whether the aspect ratio changed;
determining whether an abnormal behavior is occurring based on the change in the aspect ratio; and
determining whether to send an alert of an attack to at least one interested party that responds to attacks, based on the determining of whether the abnormal behavior is occurring.

7. The system of claim 1, the method further including at least:
capturing data;
learning a background;
separating a foreground from the background;
analyzing a bounding contour of a person;
computing shape descriptors of the bounding contour;
matching the shape descriptors with training descriptors;
determining whether an abnormal behavior is occurring based on the matching; and
determining whether to send an alert to at least one interested party, based on the determining of whether the abnormal behavior is occurring, wherein said abnormal behavior is associated with an attack.

8. The system of claim 1, the method further including:
capturing data;
selecting feature points in a scene;
identifying objects by a clustering of feature points;
determining movement of the feature points;
determining whether a behavior is abnormal based on the movement and a machine learning algorithm of abnormal behavior; and
determining whether to send an alert to at least one interested party, based on the determining of whether the abnormal behavior is occurring.

9. The system of claim 1, the method further including:
capturing data;
selecting feature points in a scene;
identifying objects by a clustering of feature points;
determining movement of the feature points;
determining whether a behavior is abnormal, based on a machine learning algorithm of behavior data; and
determining whether to send an alert to at least one interested party, based on the determining of whether the behavior is abnormal.

10. The system of claim 1, the method further including:
capturing data in the form of pixel values;
searching for patterns within the pixel values captured;
applying a learning algorithm to the patterns found;
determining whether there is an abnormal behavior based on the applying of the learning algorithm to the patterns found; and
determining whether to send an alert to at least one interested party, based on the determining of whether the abnormal behavior is occurring.

11. The system of claim 1, the method further including:
capturing thermal data;
identifying regions of elevated heat;
analyzing the regions of elevated heat to determine locations of people;
identifying changes in the regions of elevated heat that correspond to people;
determining whether an abnormal behavior is present based on a learning algorithm of abnormal behavior related to the change in body temperature of one or more persons; and
determining whether to send an alert to at least one interested party, based on the determining of whether the abnormal behavior is present.

12. The system of claim 1, the method further comprising:
capturing data;
identifying background audio noise;
identifying an audio signal of interest,
identifying known categories of audio duress;
determining whether duress is occurring based on a learning algorithm of duress, the audio signal, the audio noise, and the known categories of audio duress; and
determining whether to send an alert to at least one interested party, based on the determining of whether the abnormal behavior is occurring, wherein said abnormal behavior is associated with a chemical, biological and radiological attacks.

13. The system of claim 1, wherein the processor is located within a sensor.

14. The system of claim 13, wherein the sensor is a camera and the processor implements the analyzing.

15. The system of claim 1, wherein the one or more sensors include a camera communicatively connected to an external computing device that implements the analyzing.

16. The system of claim 1, wherein the comparing of the data to data characterizing an attack includes at least the comparing the data to data characterizing a chemical, biological or radiological attack.

17. The system of claim 1, wherein the analyzing includes at least analyzing the behavior of people to determine whether elements of the behavior correspond to duress or distress conditions.

18. A system for the detection of at least a chemical, biological, or radiological attack, comprising:
an input system for inputting attack detection parameters;
at least one sensor for measuring behavior data;
at least one transmitter for transmitting the behavior data to a remote unit;
a housing for enclosing the at least one sensor and the transmitter;
at least one remote unit, which is a unit remote from the sensor, including at least:
a receiver for receiving the behavior data from the sensor,
a memory for storing attack characteristics, and
an algorithm for:
analyzing the behavior data measured,
comparing the attack characteristics to the behavior data measured, and
determining whether the behavior data indicates the attack based on the comparing, wherein the determining whether the behavior data indicates the attack based on the comparing includes at least determining whether the behavior data indicates the attack based on whether a threshold density of people exhibit behaviors indicative of duress,
if the determining results in a determination of the attack, classifying the attack into a type of attack classification based on pre-established rules, and
further determining whether to send an alert based on the determining;
a processor that implements the algorithm and causes the transmitter to transmit the alert and the type of attack classification based on the algorithm;
the system providing a map of the location of the attack as part of reporting a crisis, therein enabling a timely response to the crisis, sending the map to first responders that are headed for the location under attack; and a transmitter that transmits the alert and the map in response to signals received from the processor resulting from the processor determining that an attack occurred based on the processor implementing the algorithm, attack settings, and status information for display on the housing.

19. The system of claim 18, further comprising:
an external systems and server unit,
a display being attached to the external systems unit for displaying attack settings and status information, and
the input system being attached to the external systems unit in a manner in which the attack settings may be entered by a person.

20. A method for detection of at least a chemical, biological, or radiological attack, comprising:
collecting data related to behavior associated with one or more persons;
analyzing the data collected to determine one or more values characterizing the behavior;
comparing the one or more values characterizing the behavior to one or more values characterizing behavior of one or more persons during a chemical, biological, or radiological attack;
determining whether the attack has occurred based on the comparing, wherein the determining whether the attack has occurred based on the comparing includes at least determining whether the data collected indicates the attack based on whether a threshold density of people exhibit behaviors indicative of duress;
if as a result of the determining it is determined that the attack has occurred, classifying the attack into a type of attack classification based on pre-established rules, determining global positioning coordinates associated with a location of the attack, activating an alert that an attack has occurred, and presenting the global positioning coordinates and the type of attack classification with the alert; and
wherein the data is collected via the at least one sensor.

21. The method of claim 20, wherein the collecting of the data is performed by using a sensor including at least a camera, a thermal camera, an audio sensor, an infrared sensor, a chemical sensor, a biological sensor, and a radiological sensor.

22. The method of claim 20, wherein the activating of the alert includes at least sending a message indicating that an attack has occurred to a device associated with a concerned party.

23. The method of claim 20, wherein the comparing of the one or more values characterizing the behavior to one or more values characterizing behavior of one or more persons during a chemical, biological, or radiological attack includes at least comparing of the one or more values characterizing the behavior to values characterizing falling, motionless, struggling, kneeling, squirming, coughing, staggering, walking sideways, disorientation, screaming, crying, and an increase in body temperature.

24. The method of claim 20, further comprising providing reports based on data collected from the at least one sensor, regardless of whether an attack was detected; and using the reports for improving the comparing step.

25. The system of claim 1, wherein the determining whether the data indicates the attack based on the comparing includes at least determining whether the data indicates the attack based on whether a threshold number of people exhibit behaviors indicative of duress.

26. The system of claim 1, wherein the determining whether the data indicates the attack based on the comparing includes at least determining whether the data indicates the attack based on whether a threshold percentage of people exhibit behaviors indicative of duress.

27. The system of claim 1, wherein the sensor system includes at least two sensors that is configured to track people between the at least two sensors.

* * * * *